US009928728B2

(12) United States Patent
Umminger, III

(10) Patent No.: US 9,928,728 B2
(45) Date of Patent: Mar. 27, 2018

(54) SCHEME FOR EMBEDDING A CONTROL SIGNAL IN AN AUDIO SIGNAL USING PSEUDO WHITE NOISE

(71) Applicant: Sony Computer Entertainment Inc., Tokyo (JP)

(72) Inventor: Frederick William Umminger, III, Oakland, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/274,571

(22) Filed: May 9, 2014

(65) Prior Publication Data

US 2015/0325116 A1 Nov. 12, 2015

(51) Int. Cl.
*G10H 1/043* (2006.01)
*H04N 11/00* (2006.01)
(Continued)

(52) U.S. Cl.
CPC ................ *G08C 17/00* (2013.01); *G08B 1/08* (2013.01); *G08B 6/00* (2013.01)

(58) Field of Classification Search
CPC .... H04R 1/1016; H04R 2430/01; G01H 3/14; G06F 3/0416
(Continued)

(56) References Cited

U.S. PATENT DOCUMENTS 5,816,823 A 10/1998 Naimark
6,243,054 B1 6/2001 DeLuca
(Continued)

FOREIGN PATENT DOCUMENTS

JP 2002171397 6/2002
JP 2003506918 2/2003
(Continued)

OTHER PUBLICATIONS

Patent Cooperation Treaty; "International Search Report" issued in corresponding PCT Application No. PCT/US2015/028761, dated Aug. 4, 2015; 2 pages.
(Continued)

*Primary Examiner* — George Monikang
(74) *Attorney, Agent, or Firm* — Fitch, Even, Tabin & Flannery, LLP

(57) ABSTRACT

A method includes generating an audio signal, generating a control signal that is configured to control a haptic feedback device that is incorporated into a device for delivering audio based on the audio signal to a user, and embedding the control signal in the audio signal by using a pseudorandom signal to form an encoded audio signal. Another method includes receiving a signal that includes an audio signal having an embedded control signal, recovering the control signal from the received signal by using a pseudorandom signal, using the recovered control signal to control a haptic feedback device that is incorporated into a device for delivering audio, recovering the audio signal from the received signal, and using the recovered audio signal to generate audio in the device for delivering audio. Systems perform similar steps, and non-transitory computer readable storage mediums each store one or more computer programs.

27 Claims, 14 Drawing Sheets

(51) Int. Cl.

| | |
|---|---|
| ***H04R 29/00*** | (2006.01) |
| ***G10H 1/16*** | (2006.01) |
| ***G08C 17/00*** | (2006.01) |
| *G08B 6/00* | (2006.01) |
| *G08B 1/08* | (2006.01) |

(58) Field of Classification Search
USPC .......................................... 381/56, 58, 61, 62
See application file for complete search history.

(56) References Cited

U.S. PATENT DOCUMENTS

| | | | | |
|---|---|---|---|---|
| 6,559,813 | B1 | 5/2003 | DeLuca | |
| 6,792,542 | B1 | 9/2004 | Lee | |
| 6,947,893 | B1 | 9/2005 | Iwaki | |
| 7,269,734 | B1 * | 9/2007 | Johnson | G06T 1/0021 375/E7.026 |
| 7,565,295 | B1 | 7/2009 | Hernandez-Rebollar | |
| 2002/0054756 | A1 | 5/2002 | Ogino | |
| 2004/0247121 | A1 | 12/2004 | Lee | |
| 2007/0067694 | A1 | 3/2007 | Spencer | |
| 2007/0121952 | A1 * | 5/2007 | Engdegard | G10L 19/008 381/10 |
| 2010/0066512 | A1 | 3/2010 | Rank | |
| 2010/0260371 | A1 * | 10/2010 | Afshar | H04R 7/24 381/394 |
| 2011/0064251 | A1 * | 3/2011 | Siotis | H04R 1/2834 381/191 |
| 2011/0119065 | A1 | 5/2011 | Pietrusko | |
| 2012/0127088 | A1 | 5/2012 | Pance | |
| 2013/0077658 | A1 * | 3/2013 | Hui | H04B 7/0413 375/219 |
| 2014/0118127 | A1 | 5/2014 | Levesque | |
| 2015/0325115 | A1 | 11/2015 | Wardle | |

FOREIGN PATENT DOCUMENTS

| | | | |
|---|---|---|---|
| JP | 2011141890 | | 7/2011 |
| WO | 0110065 | A1 | 2/2001 |
| WO | 2013136133 | | 9/2013 |

OTHER PUBLICATIONS

Patent Cooperation Treaty; "Notification of Transmittal of the International Search Report and the Written Opinion of the International Searching Authority, or the Declaration" issued in corresponding PCT Application No. PCT/2015/028761, dated Aug. 4, 2015; 2 pages.

Patent Cooperation Treaty; "Written Opinion of the International Searching Authority" issued in corresponding PCT Application No. PCT/US2015/028761, dated Aug. 4, 2015; 9 pages.

U.S.; Unpublished U.S. Appl. No. 14/274,555, filed May 9, 2014.

U.S.; Final Office Action issued in U.S. Appl. No. 14/274,555, Mar. 29, 2016, 14 pages.

USPTO; Office Action issued in U.S. Appl. No. 14/274,555, dated Jul. 14, 2016, 12 pages.

USPTO; Final Office Action issued in U.S. Appl. No. 14/274,555, dated Mar. 27, 2017, 14 pages.

Japanese Patent Office; "Notification of Reason(s) for Refusal" issued in corresponding Japanese Patent Application No. 2016-566695, dated Jul. 18, 2017, 6 pages (with English translation).

USPTO; Office Action issued in U.S. Appl. No. 14/274,555, dated Jul. 27, 2017, 15 pages.

European Patent Office; "Extended European Search Report" issued in corresponding European Patent Application No. 15789897.4, dated Nov. 3, 2017, 7 pages.

* cited by examiner

SCHEME FOR EMBEDDING A CONTROL SIGNAL IN AN AUDIO SIGNAL USING PSEUDO WHITE NOISE

CROSS-REFERENCE TO RELATED APPLICATIONS

This application is related to U.S. patent application Ser. No. 14/274,555, filed on May 9, 2014, entitled "SCHEME FOR EMBEDDING A CONTROL SIGNAL IN AN AUDIO SIGNAL," the entire disclosure of which is incorporated by reference herein in its entirety.

BACKGROUND OF THE INVENTION

1. Field of the Invention

The present invention relates generally to computer simulation output technology, and more specifically to audio and haptic technology that may be employed by computer simulations, such as computer games and video games.

2. Discussion of the Related Art

Computer games, such as video games, have become a popular source of entertainment. Computer games are typically implemented in computer game software applications and are often run on game consoles, entertainment systems, desktop, laptop, and notebook computers, portable devices, pad-like devices, etc. Computer games are one type of computer simulation.

The user of a computer game is typically able to view the game play on a display and control various aspects of the game with a game controller, game pad, joystick, mouse, or other input devices and/or input techniques. Computer games typically also include audio output so that the user can hear sounds generated by the game, such as for example, the sounds generated by other players' characters like voices, footsteps, physical confrontations, gun shots, explosions, car chases, car crashes, etc.

Haptic technology, or haptics, provides physical sensations to a user of a device or system as a type of feedback or output. A few examples of the types of physical sensations that haptic technology may provide include applying forces, vibrations, and/or motions to the user.

SUMMARY OF THE INVENTION

One embodiment provides a method, comprising: generating an audio signal; generating a control signal that is configured to control a haptic feedback device that is incorporated into a device for delivering audio based on the audio signal to a user; and embedding the control signal in the audio signal by using a pseudorandom signal to form an encoded audio signal.

Another embodiment provides a non-transitory computer readable storage medium storing one or more computer programs configured to cause a processor based system to execute steps comprising: generating an audio signal; generating a control signal that is configured to control a haptic feedback device that is incorporated into a device for delivering audio based on the audio signal to a user; and embedding the control signal in the audio signal by using a pseudorandom signal to form an encoded audio signal.

Another embodiment provides a system, comprising: an audio output interface; a central processing unit (CPU) coupled to the audio output interface; and a memory coupled to the CPU and storing program code that is configured to cause the CPU to execute steps comprising generating an audio signal; generating a control signal that is configured to control a haptic feedback device that is incorporated into a device for delivering audio based on the audio signal to a user; embedding the control signal in the audio signal by using a pseudorandom signal to form an encoded audio signal; and providing the encoded audio signal to the audio output interface.

Another embodiment provides a method, comprising: receiving a signal that comprises an audio signal having an embedded control signal; recovering the control signal from the received signal by using a pseudorandom signal; using the recovered control signal to control a haptic feedback device that is incorporated into a device for delivering audio; recovering the audio signal from the received signal; and using the recovered audio signal to generate audio in the device for delivering audio.

Another embodiment provides a non-transitory computer readable storage medium storing one or more computer programs configured to cause a processor based system to execute steps comprising: receiving a signal that comprises an audio signal having an embedded control signal; recovering the control signal from the received signal by using a pseudorandom signal; using the recovered control signal to control a haptic feedback device that is incorporated into a device for delivering audio; recovering the audio signal from the received signal; and using the recovered audio signal to generate audio in the device for delivering audio.

Another embodiment provides a system, comprising: at least one sound reproducing device; at least one haptic feedback device; a central processing unit (CPU) coupled to the at least one sound reproducing device and the at least one haptic feedback device; and a memory coupled to the CPU and storing program code that is configured to cause the CPU to execute steps comprising receiving a signal that comprises an audio signal having an embedded control signal; recovering the control signal from the received signal by using a pseudorandom signal; using the recovered control signal to control the at least one haptic feedback device; recovering the audio signal from the received signal; and using the recovered audio signal to generate audio in the at least one sound reproducing device.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

As mentioned above, haptic technology, or haptics, provides physical sensations to a user of a device or system as a type of feedback or output. Some computer games, video games, and other computer simulations employ haptics. For example, a game pad that employs haptics may include a transducer that vibrates in response to certain occurrences in a video game. Such vibrations are felt by the user's hands, which provides a more realistic gaming experience.

Another potential way that a computer game or other computer simulation can employ haptics is through the use of one or more haptic feedback devices that are incorporated into a headset or headphones worn by the user. In such a scenario the haptic feedback device(s) can apply forces, vibrations, and/or motions to the user's head in response to certain occurrences in the computer simulation. Again, such forces, vibrations, and/or motions provide a more realistic experience to the user. Indeed, high quality stereo headphones which also include haptic feedback devices that couple strong vibrations to the listener's head can make the computer gaming experience more immersive.

One important challenge faced when designing such a headphone haptic feedback system is providing a robust control mechanism for the haptic feedback transducer elements. If separate audio and control communication channels must be provided from the game device to the headphones, much extra cost can be incurred.

In accordance with embodiments of the present invention, a haptic control signal is embedded in the audio signal in such a way that the audio signal quality is not noticeably degraded, and such that the control information can be robustly recovered on the headphone unit with a minimum of required processing. Furthermore, the haptic control signal is embedded in the audio signal in such a way that the haptic control signal is inaudible, which helps to avoid annoying the user. With the below described techniques the haptics control information shares the audio channel. It is believed that such embedding of the haptic control signal in the audio signal can cut costs and simplify design.

Figure 1:
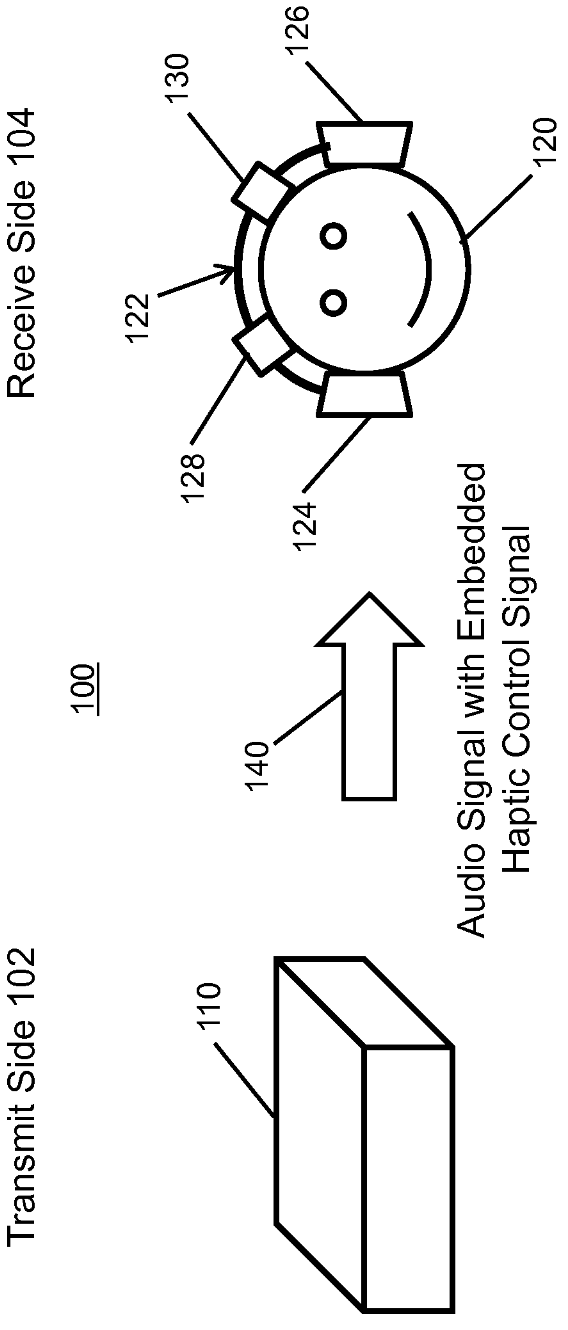
FIG. 1 is a block diagram illustrating a system in accordance with some embodiments of the present invention.

FIG. 1 illustrates an example of a system 100 that operates in accordance with an embodiment of the present invention. The system generally includes a transmit side 102 and a receive side 104. On the transmit side 102 a processor-based system 110 is used to run a computer simulation, such as a computer game or video game. By way of example, the processor-based system 110 may comprise an entertainment system, game console, computer, or the like.

On the receive side 104 there is illustrated a user 120 who is wearing an audio delivery apparatus 122. In some embodiments, the audio delivery apparatus 122 may comprise a device configured to be worn on a human's head and to deliver audio to one or both of the human's ears. In the illustrated example, the audio delivery apparatus 122 includes a pair of small loudspeakers 124 and 126 that are held in place close to the user 120's ears. In some embodiments, the small loudspeakers 124 and 126 may instead comprise any type of speaker, earbud device, in-ear monitor device, or any other type of sound reproducing device. By way of example, the audio delivery apparatus 122 may comprise a headset, headphones, an earbud device, or the like. In some embodiments, the audio delivery apparatus 122 includes a microphone. But a microphone is not required, and so in some embodiments the audio delivery apparatus 122 does not include a microphone.

In some embodiments, the audio delivery apparatus 122 also includes one or more haptic feedback devices 128 and 130. In some embodiments, the one or more haptic feedback devices 128 and 130 are incorporated into the audio delivery apparatus 122. In some embodiments, the haptic feedback devices 128 and 130 are configured to be in close proximity to the user 120's head. In some embodiments, the haptic feedback devices 128 and 130 are configured to apply forces, vibrations, and/or motions to the user 120's head. The haptic feedback devices 128 and 130 are typically controlled by a haptic control signal that may be generated by the computer simulation. By way of example, the haptic feedback devices 128 and 130 may comprise any type of haptic device, such as any type of haptic transducer or the like.

In accordance with various embodiments of the present invention, an audio signal and a haptic control signal are generated by the processor-based system 110. The haptic control signal is then embedded in the audio signal to create a modified audio signal, which is then sent to the audio delivery apparatus 122. The sending of the modified audio signal to the audio delivery apparatus 122 is indicated by arrow 140, and the sending may be via wired or wireless connection. The audio delivery apparatus 122 receives the modified audio signal and extracts the haptic control signal.

Figure 2:
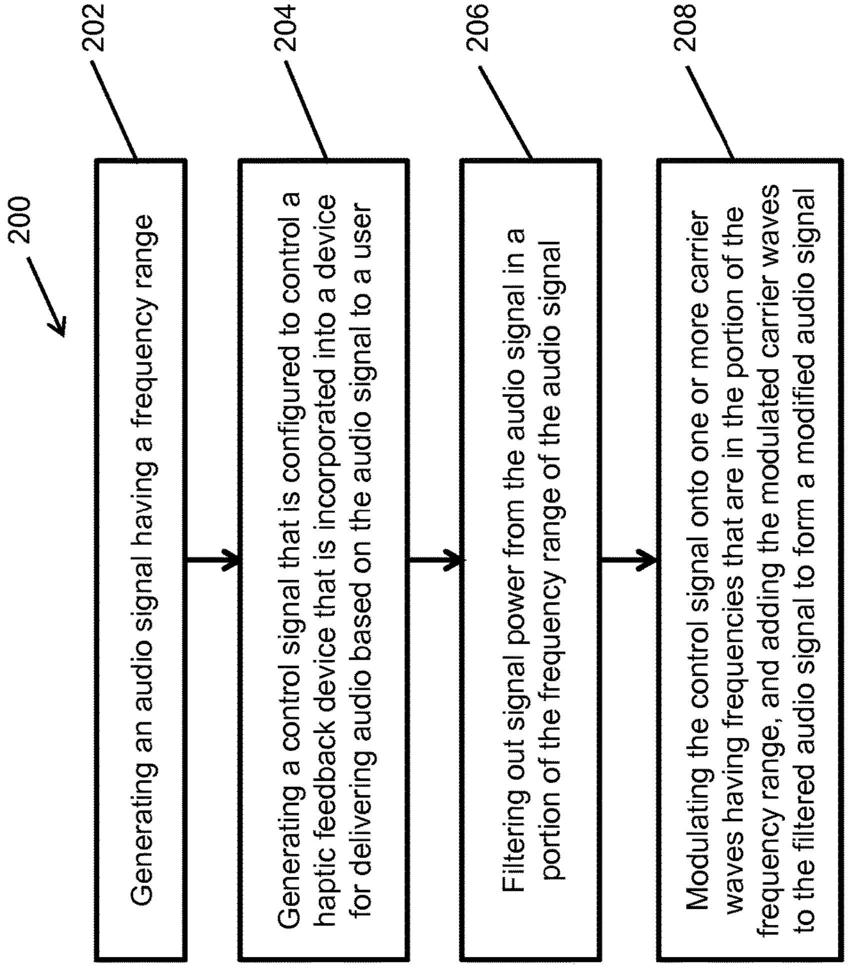
FIG. 2 is a flow diagram illustrating a method in accordance with some embodiments of the present invention.

An example of the operation of the transmit side 102 of the system 100 will now be described with reference to FIG. 2, which illustrates an example of a method 200 that operates in accordance with an embodiment of the present invention. In step 202 an audio signal is generated. More specifically, as the computer simulation runs on the processor-based system 110 it will typically generate audio. In some embodiments, the audio typically includes the sounds generated by the simulation and may also include the voices of other users of the simulation. For example, the audio may include the sounds generated by other users' characters, such as voices, footsteps, physical confrontations, gun shots, explosions, car chases, car crashes, etc.

In some embodiments, the generated audio will typically be embodied in an audio signal generated by the processor-based system 110. The generated audio signal will normally have a frequency range. In some embodiments, for example, the frequency range of the generated audio signal may be on the order of about 20 hertz (Hz) to 21 kilohertz (kHz). But it should be understood that the generated audio signal may comprise any frequency range.

In step 204 a control signal is generated that is configured to control one or more haptic feedback devices. In some embodiments, the control signal that is generated may be configured to control one or more haptic feedback devices that are incorporated into a device for delivering audio to a user. For example, in some embodiments, the control signal that is generated may be configured to control one or more haptic feedback devices that are incorporated into a headset, headphones, an earbud device, or the like. Furthermore, the type of haptic feedback device(s) used may be chosen to apply any type of forces, vibrations, motions, etc., to the user's head, ears, neck, shoulders, and/or other body part or region.

In some embodiments, the generated control signal may be configured to activate, or fire, the one or more haptic feedback devices in response to certain occurrences in the computer simulation. For example, the generated control signal may be configured to activate the one or more haptic feedback devices in response to any situation and/or at any time chosen by the designers and/or developers of the computer simulation. Furthermore, the generated control signal may comprise an analog or digital control signal. For example, in some embodiments the control signal may comprise small pulses that are configured to fire the haptics at the intended time. For example, the designers and/or developers of the computer simulation may go through the sequence of the simulation and whenever they want to trigger haptics, such as causing a buzzing or vibration, they insert a small pulse in the control signal.

Next, in some embodiments, the control signal is embedded in the audio signal. Steps 206 and 208 illustrate an example of how the control signal can be embedded in the audio signal in accordance with some embodiments of the present invention.

Figure 3A:
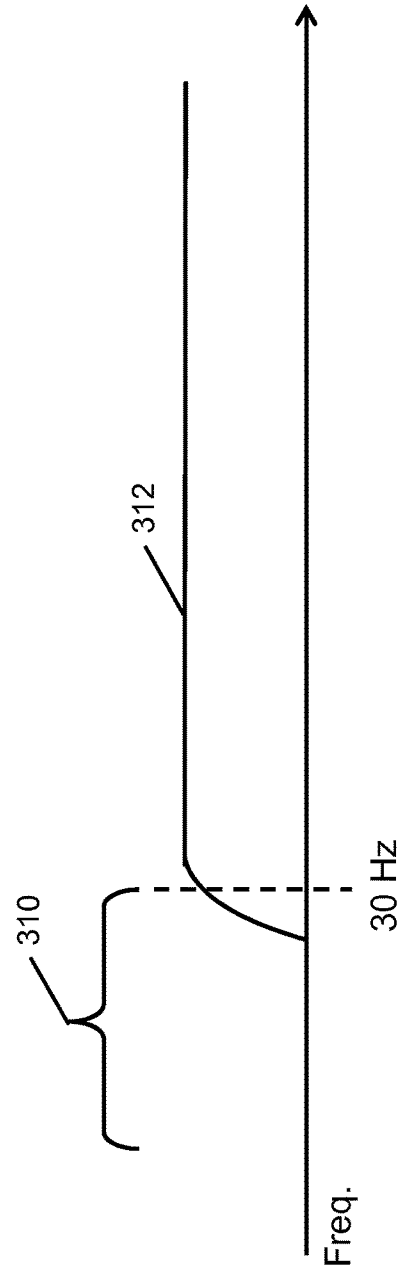
FIGS. 3A and 3B are frequency spectrum diagrams illustrating a method in accordance with some embodiments of the present invention.

Specifically, in step 206 signal power is filtered out from the generated audio signal in a portion of the frequency range. FIG. 3A is a frequency spectrum diagram illustrating an example of this step. In some embodiments, the audio signal as generated may have a frequency range on the order of about 20 Hz to 21 kHz, but it should be understood that the generated audio signal may comprise any frequency range. As shown in FIG. 3A, signal power is filtered out from a portion 310 of the frequency range of the audio signal 312. In the illustrated embodiment, the portion 310 of the frequency range that is filtered out comprises all frequencies below about 30 Hz. It is believed that frequencies below about 30 Hz is a portion of the spectrum which most humans cannot hear and/or which most humans will not notice are missing. It should be understood that the range below 30 Hz is just one example and that the cutoff of 30 Hz may be varied in accordance with embodiments of the present invention.

In some embodiments, a high-pass filter may be used to remove signal power below the chosen cutoff frequency, such as 30 Hz. That is, the generated audio signal is high pass filtered above about 30 Hz so there is nothing or nearly nothing below 30 Hz. One reason that signal power is removed from very low frequencies is so inaudible portions of the spectrum may be used to carry information that triggers haptic transducers and/or other haptic devices. That is, portions of frequency spectrum that most humans cannot hear or will not notice a difference is filtered out and then replaced with haptics control information. The range below 30 Hz is used in the present example because humans typically cannot hear or do not notice sounds below about 30 Hz. However, as will be discussed below higher frequencies near the upper end of the human audible range may also be used since most humans typically cannot hear, or will not notice a difference, at the highest frequencies near the top or just beyond the human audible range.

Figure 3B:
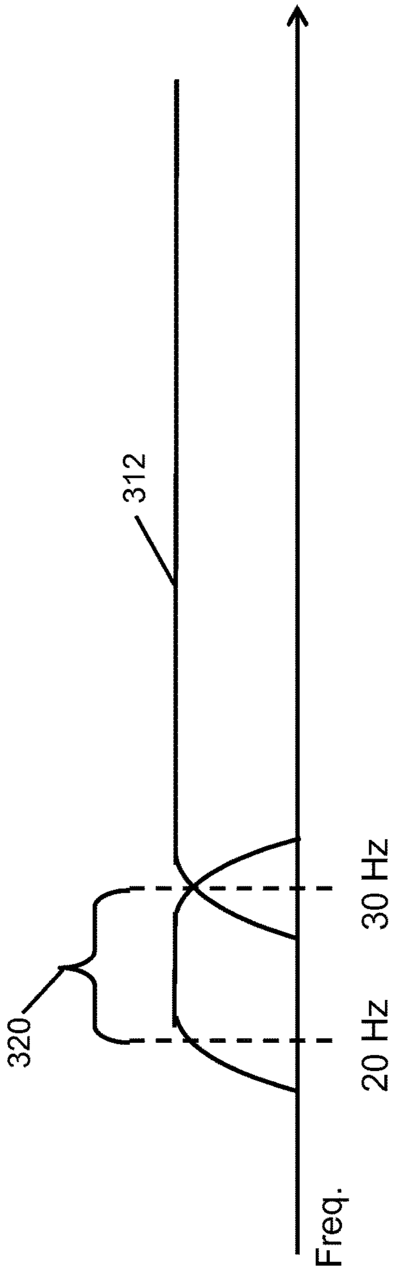

In step 208 (FIG. 2) the generated control signal is modulated onto one or more carrier waves having frequencies that are in the filtered out portion of the frequency range of the audio signal. FIG. 3B is a frequency spectrum diagram illustrating an example of this step. As shown the generated control signal is modulated onto a carrier wave having a frequency that falls within the frequency range 320. In the illustrated embodiment, the frequency range 320 comprises the range of about 20 Hz to 30 Hz. This ranges falls within the filtered out portion 310 from which signal power was removed. Furthermore, in some embodiments, the range 320 is within the bandwidth of the audio communication channel between the processor-based system 110 and the audio delivery apparatus 122 (FIG. 1).

The combination of the modulated control signal in the frequency range 320 and the remainder of the original audio signal 312 form a modified audio signal. That is, the modulated carrier wave(s) are added to the filtered audio signal to form a modified audio signal. In some embodiments, the modified audio signal comprises an audio signal having an embedded control signal. In some embodiments, the modified audio signal is then sent to an audio delivery device on the receive side, such as the audio delivery apparatus 122. In some embodiments, such sending may first involve providing the modified audio signal to an audio output interface of the processor-based system 110. Namely, the audio signal having the embedded control signal may be provided to an audio output interface of the processor-based system 110. The audio output interface may then send the modified audio signal to the audio delivery device via a wired or wireless connection.

In some embodiments, the generated control signal is modulated onto one or more carrier waves each having a frequency that falls within the frequency range 320. For example, either just one or a plurality of carrier waves may each be modulated by control signal information. In some embodiments, known techniques may be used to modulate the control data onto carrier waves. It was mentioned above that the generated control signal may comprise an analog or digital control signal. In some embodiments, the generated control signal is modulated onto a carrier by inserting small 20 Hz pulses when the haptics are intended to be fired. For example, the designers and/or developers of a computer simulation may go through the sequence of the simulation and whenever they want to trigger haptics, such as causing a buzzing or vibration, they insert a small pulse or other signal down in the range of between 20-30 Hz roughly. In some embodiments, the amplitude of such a pulse should be reasonably strong because it has to be detected on the receive side, but the amplitude should preferably not be too strong because it might cause clipping. This comprises one way that a haptics control signal may be embedded in the audio signal in some embodiments. But it should be understood that a digital haptics control signal may be modulated onto one or more carrier waves in the 20 Hz to 30 Hz range in some embodiments.

Thus, control data is modulated onto carrier waves in portions of the spectrum which most humans cannot hear or will not notice missing audio, but which are still within the bandwidth of the audio communication channel between the game device (or other system) and the headphones. Specifically, in the above described example information has been modulated onto frequencies in the range of 20 Hz to 30 Hz. In some embodiments, this is accomplished by first filtering out all signal power from the game audio on the transmit side in the chosen portion of the frequency range prior to adding in the modulated control signals. In the illustrated example, the chosen portion of the frequency range is below 30 Hz, but this cutoff frequency can be adjusted and it can be a different range in some embodiments.

An example of the operation of the receive side 104 of the system 100 (FIG. 1) will now be described. In some embodiments, a device for delivering audio, such as the audio delivery apparatus 122, receives a signal that comprises an audio signal having an embedded control signal. In some embodiments, the control signal may be embedded in the audio signal as described above. In some embodiments, the audio signal is recovered from the received signal, and then the recovered audio signal is used to generate audio in the device for delivering audio. Similarly, in some embodiments, the control signal is recovered from the received signal, and then the recovered control signal is used to control a haptic feedback device that is incorporated into the device for delivering audio.

In some embodiments, filtering is used to recover the audio signal from the received signal. For example, the received signal is filtered to remove audio signal power from a portion P of the frequency range of the received signal to form the recovered audio signal. Similarly, in some embodiments, filtering is used to recover the control signal from the received signal. For example, the received signal is filtered to remove signal power from frequencies other than the portion P mentioned above of the frequency range of the received signal to form a filtered signal. Then, in some embodiments, this second filtered signal is decoded to extract the control signal.

Figure 4:
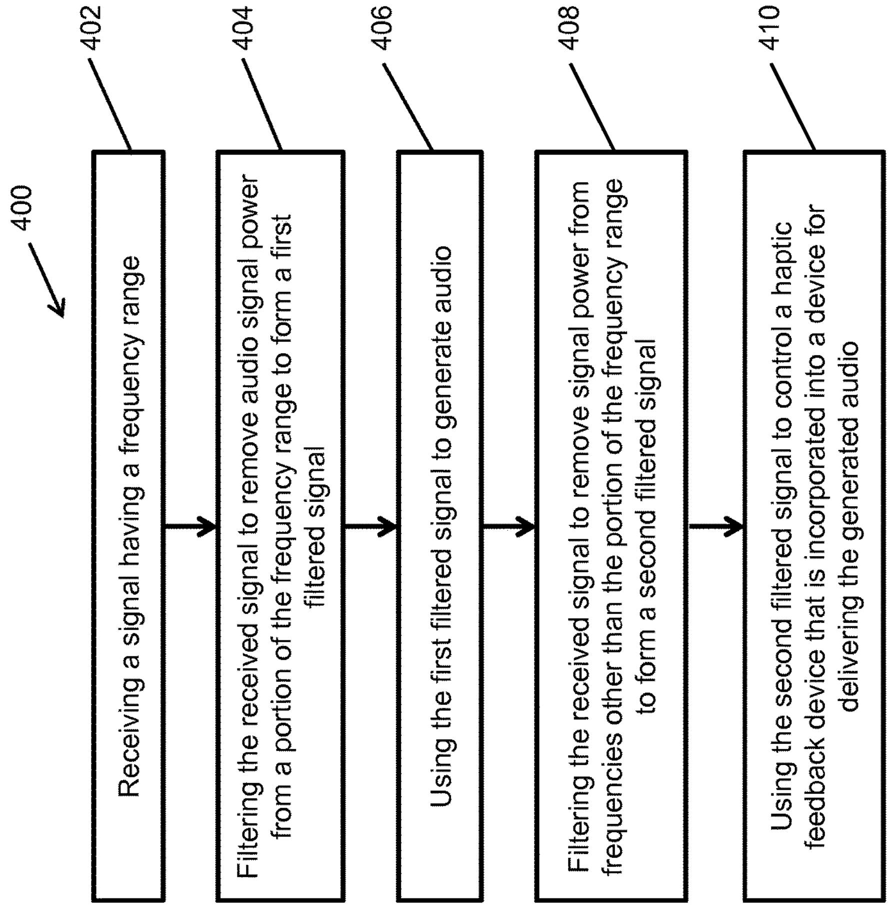
FIG. 4 is a flow diagram illustrating a method in accordance with some embodiments of the present invention.

The use of such filtering will now be explained in further detail. Namely, an example of the operation of the receive side 104 of the system 100 that involves filtering will be described with reference to FIG. 4, which illustrates an example of a method 400 that operates in accordance with an embodiment of the present invention. In general, the method 400 involves receiving a modified audio signal and then extracting or recovering the embedded haptics control information from the received signal.

Specifically, in step 402 a signal is received. In some embodiments the signal comprises a modified audio signal as described above. For example, the received signal may comprise an audio signal having an embedded control signal. In some embodiments, the received signal may comprise an audio signal having a haptics control signal modulated onto carrier waves in one or more portions of the spectrum which most humans cannot hear and/or do not notice. As such, the received signal will typically comprise a frequency range.

In some embodiments, the signal may be received by an audio delivery device, such as the audio delivery apparatus 122 (FIG. 1) described above, which may comprise a headset, headphones, an earbud device, or the like. In some embodiments, such audio delivery device may also include one or more haptic feedback devices, which may be incorporated into the audio delivery device.

In general, in some embodiments, the received signal is split into two paths. One path will provide audio output to the headphone speakers or other sound reproducing device(s), and another path will be used to extract the control signal data. Step 404 illustrates an example of the first path.

Specifically, in step 404 the received signal is filtered to remove audio signal power from a portion of the frequency range to form a first filtered signal. For example, continuing with the example embodiment described above where haptics control information has been modulated onto frequencies in the range of 20 Hz to 30 Hz, audio signal power is filtered out below 30 Hz. The remaining signal is then presented to the user's audio delivery device speakers as the desired game or other simulation audio.

Figure 5A:
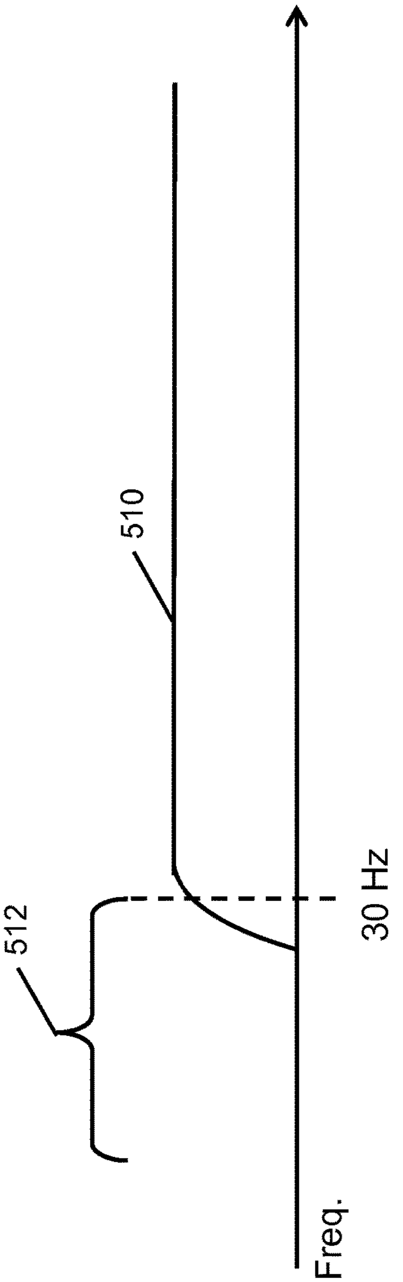
FIGS. 5A and 5B are frequency spectrum diagrams illustrating a method in accordance with some embodiments of the present invention.

An example of this step is illustrated in FIG. 5A. Specifically, the received signal 510 is filtered to remove audio signal power below 30 Hz, which is illustrated as the filtered out portion 512. Because the haptics control information was included in the filtered out portion 512, the remaining signal can be used to drive the user's audio delivery device speakers or other sound reproducing devices without interference or distortion caused by the haptics control information. In some embodiments, a high-pass filter may be used to perform the filtering.

In step 406 (FIG. 4) the first filtered signal is used to generate audio. For example, the first filtered signal may be used to drive speakers, or other sound reproducing devices, associated with an audio delivery device. Thus, in some embodiments the first filtered signal represents the recovered audio signal.

Step 408 illustrates an example of the second path mentioned above that will be used to extract the control signal data. Specifically, in step 408 the received signal is filtered to remove signal power from frequencies outside the range of 20 Hz to 30 Hz to form a second filtered signal. For example, continuing with the same example embodiment discussed above, signal power above 30 Hz is filtered out of the received signal.

Figure 5B:
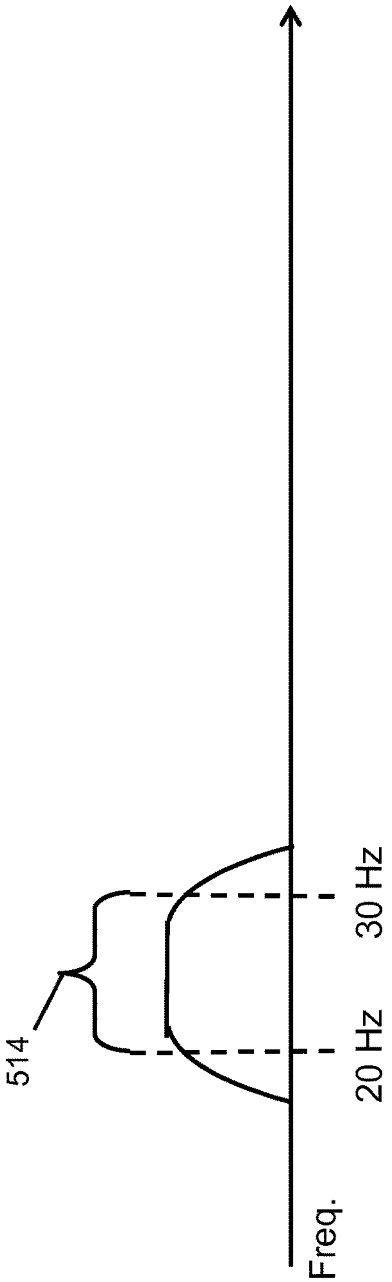

An example of this step is illustrated in FIG. 5B. Specifically, the received signal is filtered to remove all signal power above 30 Hz. The remaining portion 514 includes only the haptics control information that was modulated onto frequencies in the range of 20 Hz to 30 Hz on the transmit side. In some embodiments, a low-pass filter may be used to perform the filtering.

Finally, in step 410 (FIG. 4) the second filtered signal is used to control a haptic feedback device. As mentioned above, in some embodiments the haptic feedback control device may be incorporated into a device for delivering the generated audio. In some embodiments, the step of using the second filtered signal to control a haptic feedback device may comprise decoding the second filtered signal to extract a control signal that is configured to control the haptic feedback device. For example, after the filtering step 408 the resulting signal (i.e. remaining portion 514) may be passed to decoders which extract the control data. In some embodiments, the extracted control data corresponds to the recovered control signal. The extracted control data is then used to control the haptic feedback devices, such as haptic feedback vibrators.

Thus, as described above various embodiments of the present invention provide a means of embedding a data signal, which can be either digital or analog, within an audio signal so as not to disrupt the audible quality of the sound. The data can be extracted robustly and with minimal required computation. In some embodiments, the embedded signal is used for the purpose of controlling one or more haptic feedback devices.

It was mentioned in the above-described example that the frequency range below 30 Hz is used to carry the control information because humans typically cannot hear or do not notice sounds down in the 20 Hz to 30 Hz range. Similarly, in some embodiments higher frequencies near the upper end of the human audible range may also be used to carry the control information since humans typically cannot hear or do not notice those frequencies either.

Figure 6A:
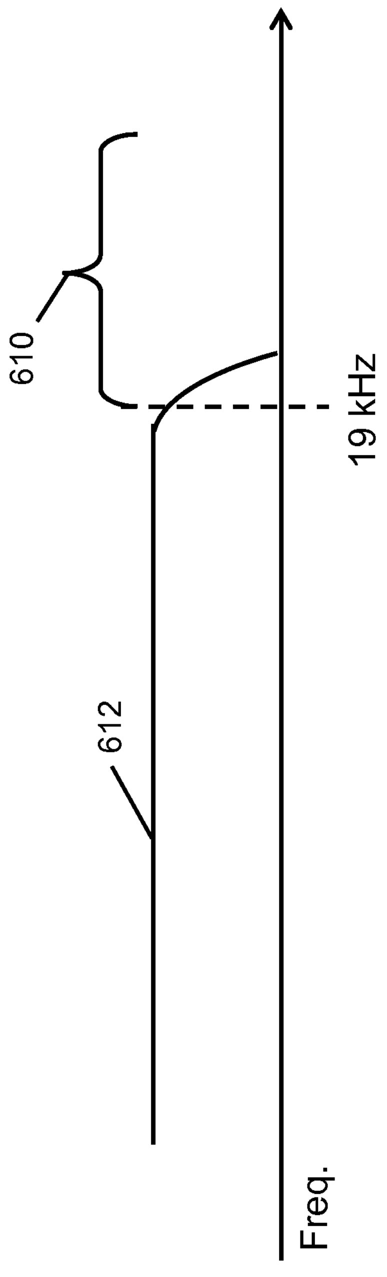
FIGS. 6A and 6B are frequency spectrum diagrams illustrating a method in accordance with some embodiments of the present invention.
Figure 6B:
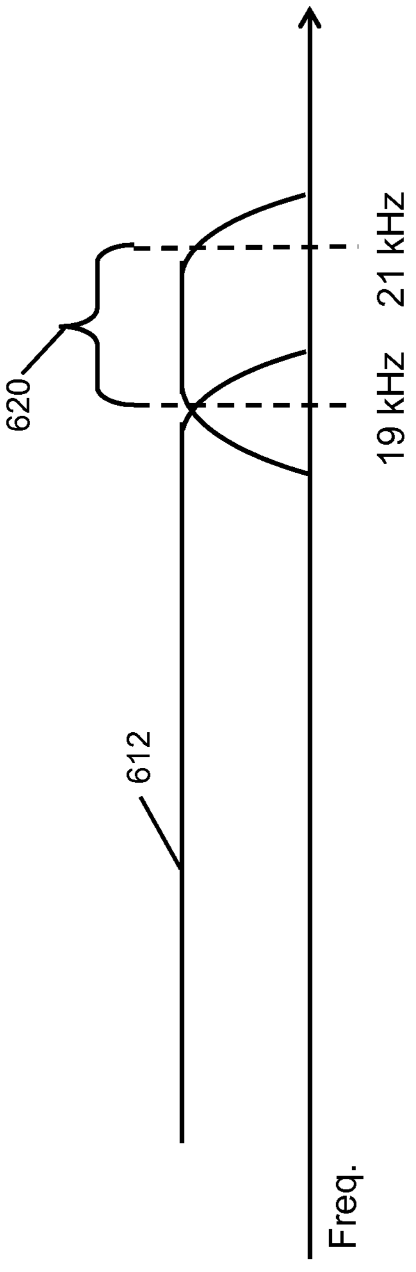

FIGS. 6A and 6B are frequency spectrum diagrams illustrating an example of the use of a higher frequency range for carrying the control information in some embodiments. In some embodiments, these figures illustrate steps performed on the transmit side. As shown in FIG. 6A, signal power is filtered out from a portion 610 of the frequency range of the audio signal 612 generated on the transmit side. In the illustrated embodiment, the portion 610 of the frequency range that is filtered out comprises all frequencies above about 19 kilohertz (kHz). It is believed that frequencies above about 19 kHz is a portion of the spectrum which most humans cannot hear or do not notice. It should be understood that the range above 19 kHz is just one example and that the cutoff of 19 kHz may be varied in some embodiments.

FIG. 6B illustrates an example of the control signal that is generated on the transmit side being modulated onto a carrier wave having a frequency that is in the filtered out portion of the frequency range. As shown the generated control signal is modulated onto a carrier wave having a frequency that falls within the frequency range 620. In the illustrated embodiment, the frequency range 620 comprises the range of about 19 kHz to 21 kHz. This ranges falls within the filtered out portion 610 from which signal power was removed. Furthermore, in some embodiments, the range 620 is within the bandwidth of the audio communication channel between the processor-based system 110 and the audio delivery apparatus 122 (FIG. 1). The combination of the modulated control signal in the frequency range 620 and the remainder of the original audio signal 612 form a modified audio signal. In some embodiments, the generated control signal is modulated onto one or more carrier waves each having a frequency that falls within the frequency range 620.

In some embodiments, a low-pass filter may be used to remove signal power above the chosen cutoff frequency, such as 19 kHz. That is, the generated audio signal is low pass filtered below about 19 kHz so there is very little above 19 kHz. Again, one reason that signal power is removed from very high frequencies is so inaudible portions of the spectrum may be used to carry information that triggers haptic transducers and/or other haptic devices. That is, portions of frequency spectrum that most humans cannot hear or do not notice is filtered out and then replaced with haptics control information. In this example, the high frequencies may be near the top or just beyond the human audible range in some embodiments.

On the receive side, in order to recover or extract the control information, in some embodiments, the received signal is split into two paths. One path will provide audio output to the headphone speakers, and another path will be used to extract the control signal data. Specifically, for the first path, the received signal is filtered to remove all audio signal power above 19 kHz. Because the haptics control information was included in the filtered out portion, the remaining signal can be used to drive the user's audio delivery device speakers, or other sound reproducing devices, without interference or distortion caused by the haptics control information.

For the second path, the received signal is filtered to remove all signal power below 19 kHz. The remaining portion includes only the haptics control information that was modulated onto frequencies in the range of 19 kHz to 21 kHz on the transmit side. The resulting signal may then be used to control a haptic feedback device, which may comprise decoding the resulting signal to extract a control signal that is configured to control the haptic feedback device. For example, the resulting signal may be passed to decoders which extract the control data. The extracted control data is then used to control the haptic feedback devices, such as haptic feedback vibrators. In some embodiments, the extracted control data corresponds to the recovered control signal.

Figure 7A:
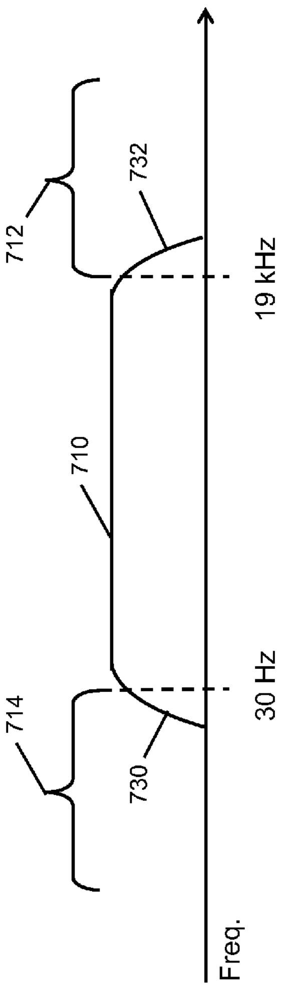
FIGS. 7A and 7B are frequency spectrum diagrams illustrating a method in accordance with some embodiments of the present invention.
Figure 7B:
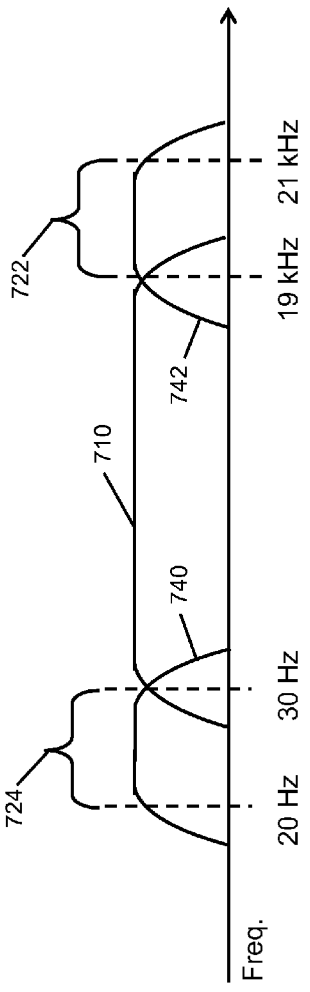

In some embodiments, both low and high frequency ranges may be used for carrying control information. FIGS. 7A and 7B are frequency spectrum diagrams illustrating an example of such an embodiment. In some embodiments, these figures illustrates steps performed on the transmit side. Specifically, referring to FIG. 7A, on the transmit side the signal power from the game or other simulation audio 710 is filtered out in two portions 712 and 714 of the frequency range which most humans cannot hear or do not notice. For example, as illustrated the signal power is filtered out in the frequency ranges of above 19 kHz and below 30 Hz prior to adding in the modulated control signals. Referring to FIG. 7B, control data is then modulated onto carrier waves in portions 722 and 724 of the spectrum which most humans cannot hear or do not notice, but which are still within the bandwidth of the audio communication channel between the game or other processor-based device and the headphones. Specifically, in the illustrated example control information is modulated on frequencies in the range of 19 kHz-21 kHz, and between 20 Hz-30 Hz.

On the receive side, in some embodiments, similar to as discussed above, the signals are split into two paths. One path will provide audio output to the headphone speakers, and another path will be used to extract the control signal data. For the first path, audio signal power is filtered out above 19 kHz, and below 30 Hz. The remaining signal is then presented to the user's headphone speakers, or other sound reproducing devices, as the desired game audio. In some embodiments, this corresponds to the recovered audio signal. For the second path, signal power is filtered out which is between 30 Hz and 19 kHz, and then the resulting signal is passed to the decoders which extract the control data, which is then used to control the haptic feedback devices.

Thus, as described above and herein, in some embodiments inaudible, or near inaudible, portions of the spectrum may be used to carry information that triggers haptic transducers or other haptic feedback devices. In some embodiments, an inaudible haptic control signal is embedded in audio signal, and the embedded control signal may be specifically for the control of one or more haptic feedback devices which also incorporate audio playback.

In some embodiments, such a scheme may be implemented by filtering out one or more portions of the frequency spectrum that most humans cannot hear, or which most humans do not notice, and/or which many humans can only barely hear. In some embodiments, the filtered out portion of the frequency spectrum may be near the low end of the human audible range, near the high end of the human audible range, or both. For example, humans typically cannot hear or do not notice sounds down around 20 Hz, nor up at around 20 kHz. In some embodiments, a high-pass filter may be used to filter out a portion near the low end of the audible range, and a low-pass filter may be used to filter out a portion near the high end of the audible range. Such filtering may remove nearly all audible frequencies in those ranges. In some embodiments, it may be advantageous to use only the portion near the low end of the audible range, or only the portion near the high end of the audible range.

In the above described examples 30 Hz was used as the cutoff on the low end, and 19 kHz was used as the cutoff on the high end. It should be understood that these are just examples and that the cutoff frequencies at the low end and/or the high end may be varied in accordance with various embodiments of the present invention. For example, at the low end cutoff frequencies of about or near 40 Hz, 35 Hz, 27 Hz, 25 Hz, 22 Hz, 20 Hz, or any other frequency, may be used in some embodiments. Similarly, at the high end cutoff frequencies of about or near 17 kHz, 18 kHz, 19.5 kHz, 20 kHz, or any other frequency, may be used in some embodiments.

In some embodiments, the cutoff frequencies may be chosen by considering one or more design tradeoffs. For example, on the low end of the human audible range, the higher the cutoff frequency is, the more bandwidth there is below the cutoff for the control data/signal. That is, more control information can be embedded at the low end if the cutoff frequency is higher. On the other hand, the lower the cutoff frequency is, the more bandwidth there is for the audio. That is, more of the lower frequency audio sounds can be retained by the audio signal if the cutoff frequency is lower.

Similarly, on the high end of the human audible range, the lower the cutoff frequency is, the more bandwidth there is above the cutoff for the control data/signal. That is, more control information can be embedded at the high end if the cutoff frequency is lower. On the other hand, the higher the cutoff frequency is, the more bandwidth there is for the audio. That is, more of the higher frequency audio sound can be retained by the audio signal if the cutoff frequency is higher.

In some embodiments, one consideration for choosing the cutoff frequencies may include determining how much the users care about the quality of the audio they hear. For example, if the users want the very best audio quality, then the cutoff frequencies could be chosen to be right at, or just beyond, the low and high frequencies that most humans are no longer capable of hearing. Such cutoff frequencies would provide a large amount of bandwidth for the audio. On the other hand, if the users do not want or need the very best audio quality, then for example the cutoff frequency at the low end can be raised such that it might possibly extend into a portion of the human audible range. Similarly, for example the cutoff frequency at the high end can be lowered such that it might possibly extend into a portion of the human audible range. This would slightly degrade the audio quality but would allow more bandwidth for the control information.

Thus, for example, if very good audio quality on the low end is needed, then the cutoff frequency could be set at a frequency at or below 30 Hz where the ability of a human to hear begins to decrease rapidly. On the other hand, if very good audio quality on the low end is not needed, then the cutoff frequency could be set higher than 30 Hz. For example, if the users do not care about the quality of the bass sounds in the audio, then perhaps the cutoff frequency could be set to something like 60 Hz. Thus, in some embodiments, the cutoff frequency is set to be below human hearing, or at a point where the users do not care about degraded bass quality.

In some embodiments it may be important to have high quality audio at only the low end, or at only the high end. In such embodiments, the cutoff frequencies can be selected to accommodate these needs. For example, if high quality audio is needed at the low end but not the high end, then the cutoff frequency at the low end can be set very low in order to include the lowest human audible frequencies. And the cutoff frequency at the high end can be set somewhat low, perhaps extending into the highest human audible frequencies, in order to provide greater bandwidth for the control information. Thus, in some embodiments, the need for quality audio at one end of the frequency range can be offset by greater bandwidth for control information at the other end of the frequency range.

After the cutoff frequencies are chosen for the low and/or high ends of the audio signal, then in some embodiments the frequencies are cleared out of the audio signal to make room for the control information. As mentioned above, a high-pass filter may be used to clear out frequencies at the low end, and a low-pass filter may be used to clear out frequencies at the high end. In some embodiments, and depending upon the quality of the filters used, there may be leaking in the filtering process. For example, in FIG. 7A there is leaking 730 of the audio signal below 30 Hz on the low end, and leaking 732 of the audio signal above 19 kHz on the high end. As illustrated, the leaking causes the cutoffs to not be sharp. In some embodiments, higher quality filters can make the cutoffs sharper with less leaking. In some embodiments, such leaking is another consideration when choosing the cutoff frequencies.

After the low and/or high ends of the audio signal are filtered, then the control information may be added. The control information may be embedded in the filtered portion of the low end, the filtered portion of the high end, or the filtered portions of both ends. In some embodiments, the control information is embedded by modulating it onto one or more carrier waves having frequencies that are within one or both of the filtered out portions of the audio signal. In some embodiments, part of the modulation process involves generating the one or more carrier waves having frequencies that are within the filtered out portions of the audio signal. In some embodiments, an oscillator may be used to generate the carrier waves. Use of an oscillator allows the developer to choose the kind of wave that is sent. However, in some embodiments, use of an oscillator can cause ringing. As such, use of an oscillator is not required. Therefore, in some embodiments an oscillator is not used.

As mentioned above, the generated and embedded control signal may comprise an analog or digital control signal. For example, in some embodiments the control signal may comprise small 20 Hz pulses that are inserted whenever the haptics should be activated. In some embodiments, the control signal may comprise small 25 Hz pulses, 27 Hz pulses, or pulses having any frequency within the filtered out portion, that are inserted whenever the haptics should be activated.

In some embodiments, there may be leaking or bleeding of the embedded control signal. For example, in FIG. 7B there is leaking 740 of the control signal above 30 Hz on the low end, and leaking 742 of the control signal below 19 kHz on the high end. In some embodiments, such leaking or bleeding is another consideration when choosing the cutoff frequencies. For example, in some embodiments, it may be advantageous to embed the control signal on the low end as low as practical, such as for example around 20 Hz, so that the control signal does not bleed too high into the audio signal.

In some embodiments, the potential leaking or bleeding of the embedded control signal presents additional design tradeoffs that can be considered. For example, the control signal can be made easier to pick out from any bleed (on the audio side) by making it louder, but then there is less headroom for the audio. Furthermore, another constraint is that the two signals are being added together, which at some point will boost the peak. Adding them together raises the possibility that they will clip, and it is preferable to avoid clipping.

An example of another design tradeoff is that the narrower the bandwidth of the control signal, the broader it is in the time domain. This means that a narrow bandwidth control signal is not going to be very sharp and quick. For example, a 20 Hz control signal would be 50 milliseconds (msec), which means it would not be sharper than about 50 msec of length, which is not very sharp. Conversely, the broader the bandwidth of the control signal, the shorter it is in the time domain. Thus, in order to have a sharp and quick control signal, it would need to take up more frequency space. For example, a 1000 Hz control signal would get down to 1 msec of length, which would be sharp and quick, but it would be terrible for the audio because it would extend well into the human audible range, such as the range of human voice.

Finally, in some embodiments, after the original audio signal is modified to embed the control information, the modified signal is sent to the receive side. At the receive side, in some embodiments, the frequency range(s) where the control information was embedded is isolated. Examples have been described above. Then the control information is detected in that frequency range(s). For example, in some embodiments, the control pulses are detected in the isolated frequency range(s), which are then used to trigger the haptics.

There will now be described another technique that may be used for embedding a control signal in an audio signal in accordance with some embodiments of the present invention. In some embodiments, this technique is similar to a spread-spectrum technique and uses a low level pseudorandom white noise that survives the transmission process from the transmit side to the receive side.

In general, in some embodiments the low level pseudorandom white noise is used to hide the haptics control signal in the audio signal. Another way to hide the haptics control signal would be to encode it in the low order bits of the audio signal. For example, the least significant bit could be used as an on/off for the haptics. But one problem with this technique is that the audio compression would scramble the low order bits, which means the haptics control signal could not be recovered on the receive side. Another process that could disrupt the low-order bits is a combined digital to analog and analog to digital conversion. If the low order bits are removed and not subjected to the audio compression, they could still be scrambled by noise. If the haptics control signal is embedded in the audio signal at a high enough amplitude so that it will not get scrambled by noise, then the user will hear it, which will be annoying to the user.

In some respects, the low level pseudorandom white noise used in some embodiments of the present technique is akin to artificial low order bits. Or conversely, the low order bits are like a low level white noise. Thus, some embodiments of the present technique use a signal that sounds like a low level white noise but which will survive the transmission process from the transmit side to the receive side and that can be decoded.

Thus, in some embodiments of the present invention, the control signal is embedded in the audio signal by using a pseudorandom signal to form an encoded audio signal. And on the receive side, in some embodiments, the control signal and/or the audio signal are recovered from the encoded audio signal by using the pseudorandom signal.

In general, in some embodiments, the technique operates as follows. On the transmit side, such as for example the transmit side 102 (FIG. 1), the original audio signal is multiplied by a pseudorandom signal, such as for example a low level pseudorandom white noise signal, to form a first resultant signal. In some embodiments, the low level pseudorandom white noise signal is configured such that multiplying the first resultant signal again by the pseudorandom white noise signal will produce the original audio signal. The haptics control signal is then added to the first resultant signal to form a second resultant signal. The second resultant signal is then multiplied by the low level pseudorandom white noise signal to form an encoded audio signal. The encoded audio signal is then transmitted to the receive side, such as for example the receive side 104.

In some embodiments, the encoded audio signal sounds like the original audio signal plus some added white noise. Without the final multiplication the output will be a white noise. In some embodiments it might be desirable to send the combined audio and embedded control signal in an encoded form that sounds like white noise. But when the final multiplication is performed the encoded audio may be sent to the receive side in a form perceptually similar to the original audio.

On the receive side, in some embodiments, the encoded audio signal is first multiplied by the low level pseudorandom white noise signal to form a first resultant signal. In some embodiments, the haptics control signal is recovered from the first resultant signal by filtering the first resultant signal. In some embodiments, filtering is not needed for recovering the haptics control signal from the first resultant signal. For example, in some embodiments the haptics control signal is recovered from the first resultant signal by applying a threshold or applying some other noise reduction or signal detection technique. In some embodiments, the audio signal is recovered from the first resultant signal by multiplying the first resultant signal by the low level pseudorandom white noise signal.

Figure 8:
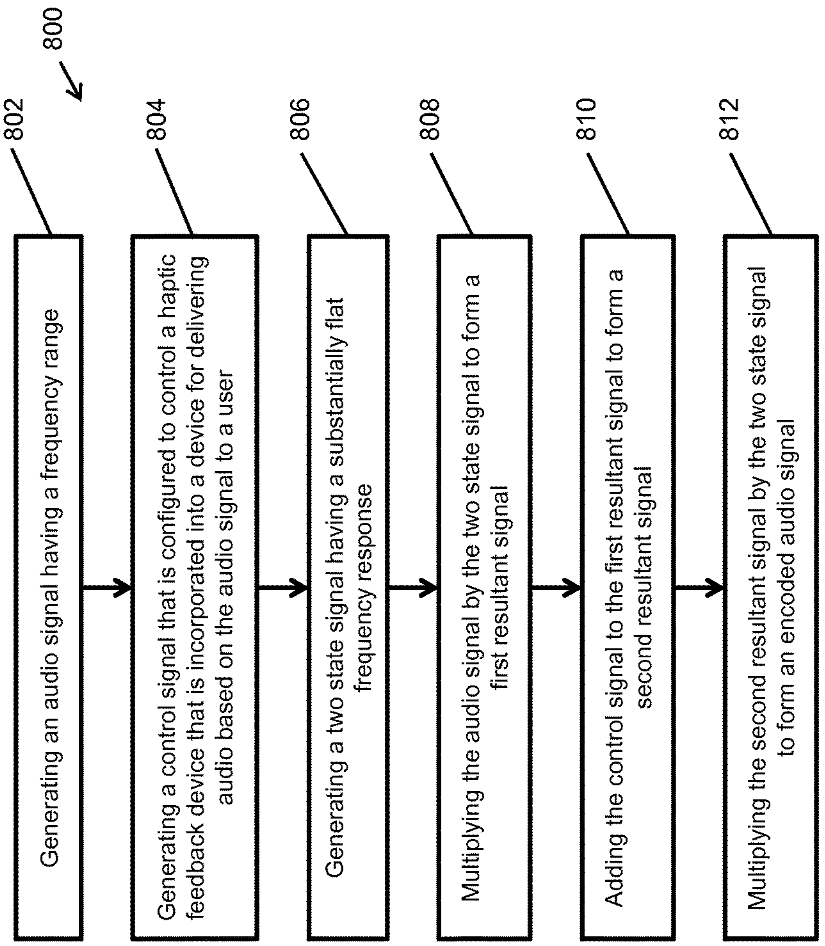
FIG. 8 is a flow diagram illustrating a method in accordance with some embodiments of the present invention.
Figure 9A:
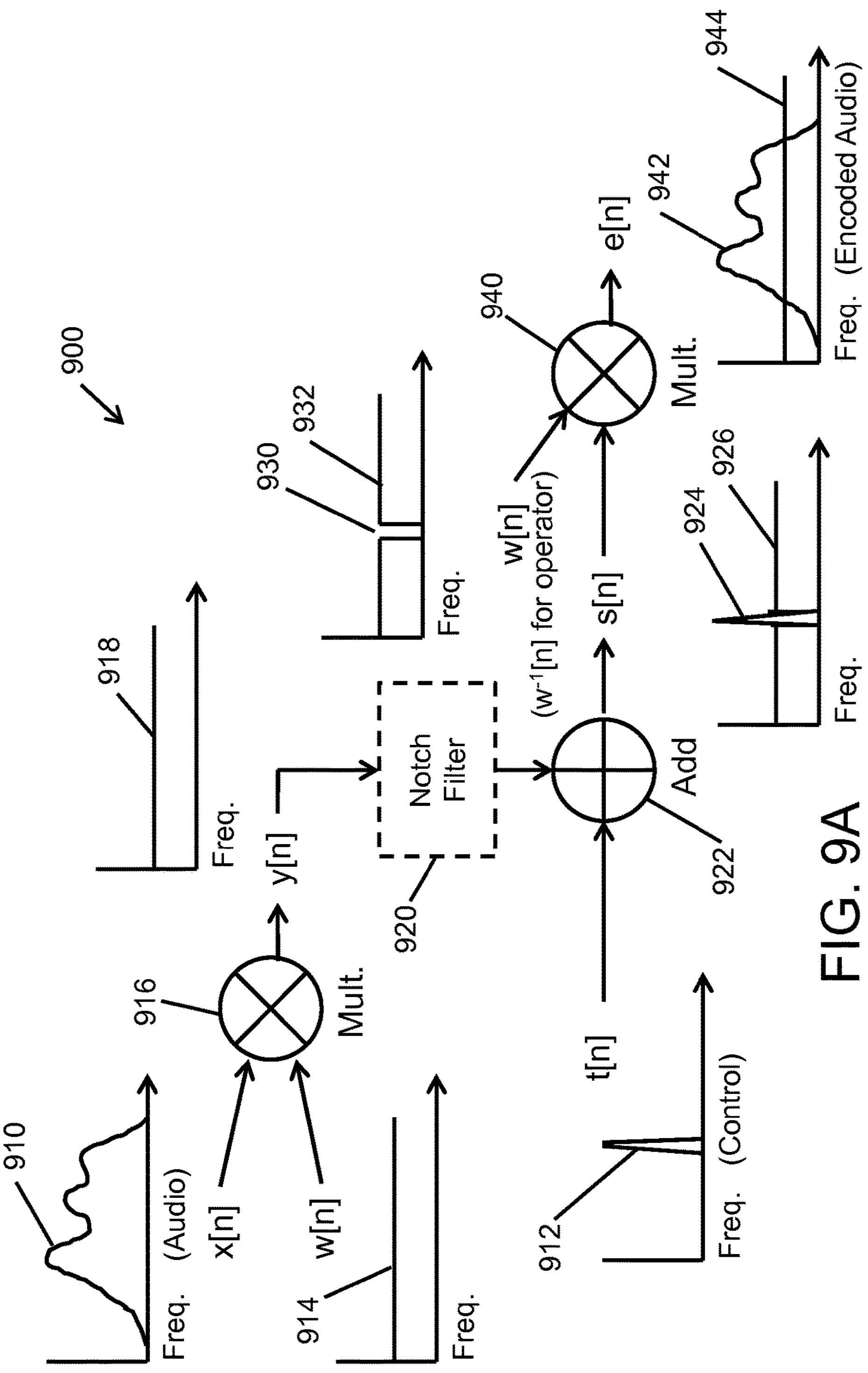
FIG. 9A is a block diagram illustrating a system in accordance with some embodiments of the present invention.

An example of the operation of this technique on the transmit side 102 of the system 100 will now be described in further detail. FIG. 8 illustrates an example of a method 800 that operates in accordance with some embodiments of the present invention, and FIG. 9A illustrates an example of a transmit side system 900 that may be used to perform the method 800 in accordance with some embodiments of the present invention. In some embodiments, the method 800 and the transmit side system 900 perform a method of encoding the audio signal to include the control signal. In some embodiments, the method 800 and the transmit side system 900 may be implemented by a processor-based system, such as the processor-based system 110 (FIG. 1).

In step 802 an audio signal is generated. Similar to as described above, audio may be generated by a computer simulation running on a processor-based system. In some embodiments, the generated audio will typically be embodied in an audio signal having a frequency range. In some embodiments, for example, the frequency range of the generated audio signal may be on the order of about 20 hertz (Hz) to 21 kilohertz (kHz). But it should be understood that the generated audio signal may comprise any frequency range.

In FIG. 9A the generated audio signal is illustrated as x[n], which has a corresponding frequency spectrum diagram 910. The audio signal x[n] comprises a substantially full audio spectrum in the human audible range.

In step 804 a control signal is generated that, similar to as described above, is configured to control one or more haptic feedback devices. In some embodiments, the control signal that is generated may be configured to control one or more haptic feedback devices that are incorporated into a device for delivering audio to a user. Furthermore, similar to as described above, in some embodiments the generated control signal may be configured to activate, or fire, the one or more haptic feedback devices in response to certain occurrences in the computer simulation. And the type of haptic feedback device(s) used may be chosen to apply any type of forces, vibrations, motions, etc., to the user's head, ears, neck, shoulders, and/or other body part or region.

In FIG. 9A the generated control signal is illustrated as t[n], which has a corresponding frequency spectrum diagram 912. The control signal t[n] is the signal that will be hid in the audio signal. In the illustrated embodiment, the control signal t[n] comprises a narrow frequency band. As such, the control signal t[n] peaks because it is very concentrated at one narrow frequency band. In some embodiments the control signal t[n] may comprise small pulses in a narrow frequency band that are configured to fire the haptics at the intended time. In some embodiments, the narrow frequency band of the control signal t[n] may be positioned at many different locations in the audio spectrum. One reason for this is that, in some embodiments, the control signal t[n] is being positioned in the scrambled domain that has no relation to human hearing.

As mentioned above, some embodiments of the present technique use a low level pseudorandom white noise that survives the transmission process from the transmit side to the receive side. Thus, in some embodiments the next step is to generate a pseudorandom signal. Then, in some embodiments, the control signal is embedded in the audio signal by using the pseudorandom signal to form an encoded audio signal.

Different types of pseudorandom signals may be used. In some embodiments, the pseudorandom signal may comprise a signal having pseudorandom invertible operators as values. An example of such an embodiment will be discussed below. In some embodiments, the pseudorandom signal may comprise a signal having only two values or states, such as for example +1 and −1. That is, such a pseudorandom signal has pseudorandom values of only +1 and −1. This type of a pseudorandom signal will be referred to herein as a two state signal. As will be discussed below, in some embodiments, a two state signal comprises a simple case of a signal having pseudorandom invertible operators as values.

The following description of FIGS. 8 and 9 will first assume that the pseudorandom signal that is generated comprises a two state signal. Thus, in step 806 a two state signal is generated. Such a two state signal comprises one example of the aforementioned low level pseudorandom white noise signal. In some embodiments the two state signal has a substantially flat frequency response and sounds like a low level white noise. In some embodiments, the two state signal varies pseudorandomly between only two states.

In FIG. 9A the pseudorandom signal is illustrated as w[n], and as mentioned above it will first be assumed that w[n] comprises a two state signal. The two state signal w[n] has a corresponding frequency spectrum diagram 914. In the illustrated embodiment, the two state signal w[n] has a substantially flat frequency response. That is, the two state signal w[n] has equal energy at substantially every frequency, thus making it completely flat over the audio spectrum. In some embodiments, the two state signal w[n] comprises a substantially full audio spectrum in the human audible range.

In some embodiments, the two state signal w[n] comprises states of positive one and negative one. In such embodiments, the states of positive one and negative one are the only states of the two state signal w[n], which may be represented by the following equation:

$$w[n]=+1 \text{ or } -1 \text{ (pseudorandomly)}$$

That is, in some embodiments, the two state signal w[n] changes pseudorandomly between only +1 and −1. Thus, it follows that:

$$w^2[n]=1$$

In some embodiments, the changes between +1 and −1 may be predetermined Predetermining the changes between +1 and −1 of the two state signal w[n] allows the two state signal w[n] to be easily repeated. In some embodiments, the two state signal w[n] will be repeated on the receive side.

In step 808 the audio signal is multiplied by the two state signal to form a first resultant signal. In some embodiments, the first resultant signal comprises a substantially flat frequency response.

In FIG. 9A this step is illustrated by the audio signal x[n] being multiplied by the two state signal w[n] by the multiplier 916. The result of the multiplication is the first resultant signal y[n], which has a corresponding frequency spectrum diagram 918. Thus, the first resultant signal y[n] is represented by the following equation:

$$y[n]=x[n]w[n]$$

In the illustrated embodiment, the first resultant signal y[n] has a substantially flat frequency response. This is because multiplying the audio signal x[n] by noise results in noise. Furthermore, in the illustrated embodiment, the first resultant signal y[n] comprises a substantially full spectrum signal, i.e. substantially full bandwidth. This is because when signals are multiplied together their bandwidths add. That is, the audio signal x[n] is full audio spectrum, and when it is multiplied by the two state signal w[n], the result is full spectrum.

Thus, multiplying the audio signal x[n] by the two state signal w[n], which represents pseudorandom white noise, results in white noise, which is illustrated as the first resultant signal y[n] with frequency spectrum diagram 918.

It was mentioned above that in some embodiments the pseudorandom white noise signal is configured such that multiplying the first resultant signal again by the pseudorandom white noise signal will produce the original audio signal. Configuring the two state signal w[n] to have only the states of positive one and negative one as described above is one way to achieve this result. This can be shown by the following equations:

$$x[n]=y[n]w[n]=(x[n]w[n])w[n]$$

$$\text{when } w[n]=+1 \text{ or } -1 \text{ (pseudorandomly)}$$

$$\text{because } w^2[n]=1$$

The ability to recover the original audio signal x[n] by again multiplying by the two state signal w[n] will be utilized on the receive side, which will be discussed below.

In step 810 the control signal, or trigger signal, is added to the first resultant signal to form a second resultant signal. In some embodiments, the second resultant signal comprises a peak in a narrow frequency band rising above a substantially flat frequency response.

In FIG. 9A this step is performed with the adder 922. The following explanation will initially disregard the illustrated notch filter 920, which is an optional feature. Assuming the notch filter 920 is not present, the control signal t[n] is added to the first resultant signal y[n] by the adder 922. The result of the addition is the second resultant signal s[n], which has a corresponding frequency spectrum diagram indicated by 924 and 926. Thus, the second resultant signal s[n] is calculated as follows:

$$s[n]=y[n]+t[n]$$

$$s[n]=x[n]w[n]+t[n]$$

In the illustrated embodiment, the second resultant signal s[n] comprises a peak 924 in a narrow frequency band rising above a substantially flat frequency response 926. This is because, as mentioned above, the control signal t[n] is very concentrated at one narrow frequency band, which causes it to peak. When the control signal t[n] is added to the first resultant signal y[n], which has a substantially flat frequency response, the result is the peak 924 rising above the substantially flat frequency response 926. The flat part 926 is essentially background noise since, as described above, the first resultant signal y[n] is essentially noise. As will be described below with respect to the receive side, the peak 924 allows the control signal t[n] to be extracted from the noise 926.

As mentioned above, the illustrated notch filter 920 is an optional feature that may be used in some embodiments. When used, the notch filter 920 is configured to filter the first resultant signal y[n] in the narrow frequency band where the control signal t[n] will be inserted. The result of this filtering is illustrated by the frequency spectrum diagram indicated by 930 and 932. A notch 930 is created in the substantially flat frequency response 932 of the first resultant signal y[n]. The notch 930 is created in the narrow frequency band where the peak 912 of the control signal t[n] will be added by the adder 922. By filtering out the signal in the notch 930 there will be nothing or very little there to interfere with the control signal that will be added and positioned in the notch 930. The notch 930 will help prevent false positives in case there are spurious high amplitude signals in that narrow frequency band. When the notch filter 920 is used the equations for the second resultant signal s[n] are modified as follows:

$$s[n]=(y[n])_{filtered}+t[n]$$

$$s[n]=(x[n]w[n])_{filtered}+t[n]$$

It is noted, however, that the below equations do not take the optional notch filter 920 into account unless otherwise stated.

Finally, in step 812 the second resultant signal is multiplied by the two state signal to form an encoded audio signal. This results in an output signal that sounds like the original audio signal plus some added white noise. Without this final multiplication the output will be white noise plus the control signal.

In FIG. 9A this step is performed with the multiplier 940. Specifically, the second resultant signal s[n] is multiplied by the two state signal w[n] by the multiplier 940. The result of the multiplication is the encoded audio signal e[n], which has a corresponding frequency spectrum diagram indicated by 942 and 944. Thus, the encoded audio signal e[n] is calculated as follows:

$$e[n]=w[n]s[n]$$

$$e[n]=w[n](y[n]+t[n])$$

$$e[n]=w[n](x[n]w[n]+t[n])$$

$$e[n]=x[n]w^2[n]+w[n]t[n]$$

Because $w[n]=+1$ or $-1$ (pseudorandomly), it follows that, $$e[n]=x[n]+w[n]t[n]$$

Thus, the encoded audio signal e[n] is equal to the original audio signal x[n] plus the original control signal t[n] multiplied by the two state signal w[n]. As explained above, the two state signal w[n] represents pseudorandom white noise. As such, the product of the control signal t[n] and the two state signal w[n] is white noise. Therefore, in the frequency spectrum diagram for the signal e[n], the original audio signal x[n] is indicated by 942 and rises above a low level noise floor indicated by 944. The low level noise floor indicated by 944 is the product of the control signal t[n] and the two state signal w[n].

Thus, the result is that the control signal t[n] is basically scrambled with white noise (i.e. w[n]) and then added to the original audio signal x[n], resulting in the original audio signal x[n] plus some noise. The noise is obtained because the peak 924 turns into flat noise after the multiplication 940. It is believed that the low level noise floor indicated by 944 will be quiet enough that most users will either not hear it, not notice it, and/or will not be bothered by it. The noise floor can be kept at a low level if the pseudo white noise signal w[n] is kept below a threshold at which humans cannot hear it or do not notice it.

In some embodiments, it might be desirable to skip step 812 and the multiplication 940 and send the combined audio and embedded control signal in an encoded form that sounds like white noise. But by using step 812 and the multiplication 940 the encoded audio signal e[n] is sent in a form perceptually similar to the original audio.

It was mentioned above that if the notch filter 920 is used the equation for the second resultant signal s[n] is modified as follows:

$$s[n]=(x[n]w[n])_{filtered}+t[n]$$

This means that if the notch filter 920 is used the encoded audio signal e[n] is calculated as follows:

$$e[n]=w[n]s[n]$$

$$e[n]=w[n]((x[n]w[n])_{filtered}+t[n])$$

$$e[n]=w[n](x[n]w[n])_{filtered}+w[n]t[n]$$

Because of the notch filtering there is no ($w^2[n]=1$) that easily drops out of the second term (i.e. $w[n](x[n]w[n])_{filtered}$) of the equation to leave only the audio signal x[n]. Instead, in some embodiments, the second term of the equation comprises a signal that is at least partly based on the audio signal x[n]. Thus, in some embodiments, it can be said that the encoded audio signal e[n] is equal to a sum of the control signal t[n] multiplied by the two state signal w[n] and a signal that is at least partly based on the audio signal x[n]. Stated differently, the encoded audio signal e[n] is equal to a signal that is at least partly based on the audio signal x[n] plus (or added to) the product of the two state signal w[n] and the control signal t[n].

Because the audio signal x[n] itself is a signal that is at least partly based on the audio signal x[n], in some embodiments it can be said that the encoded audio signal e[n] is equal to a sum of the control signal t[n] multiplied by the two state signal w[n] and a signal that is at least partly based on the audio signal x[n], whether or not the notch filter 920 is used. Stated differently, the encoded audio signal e[n] is equal to a signal that is at least partly based on the audio signal x[n] plus (or added to) the product of the two state signal w[n] and the control signal t[n], whether or not the notch filter 920 is used. This is because, in some embodiments, when the notch filter 920 is not used the signal that is at least partly based on the audio signal x[n] is equal to the audio signal x[n].

Figure 9B:
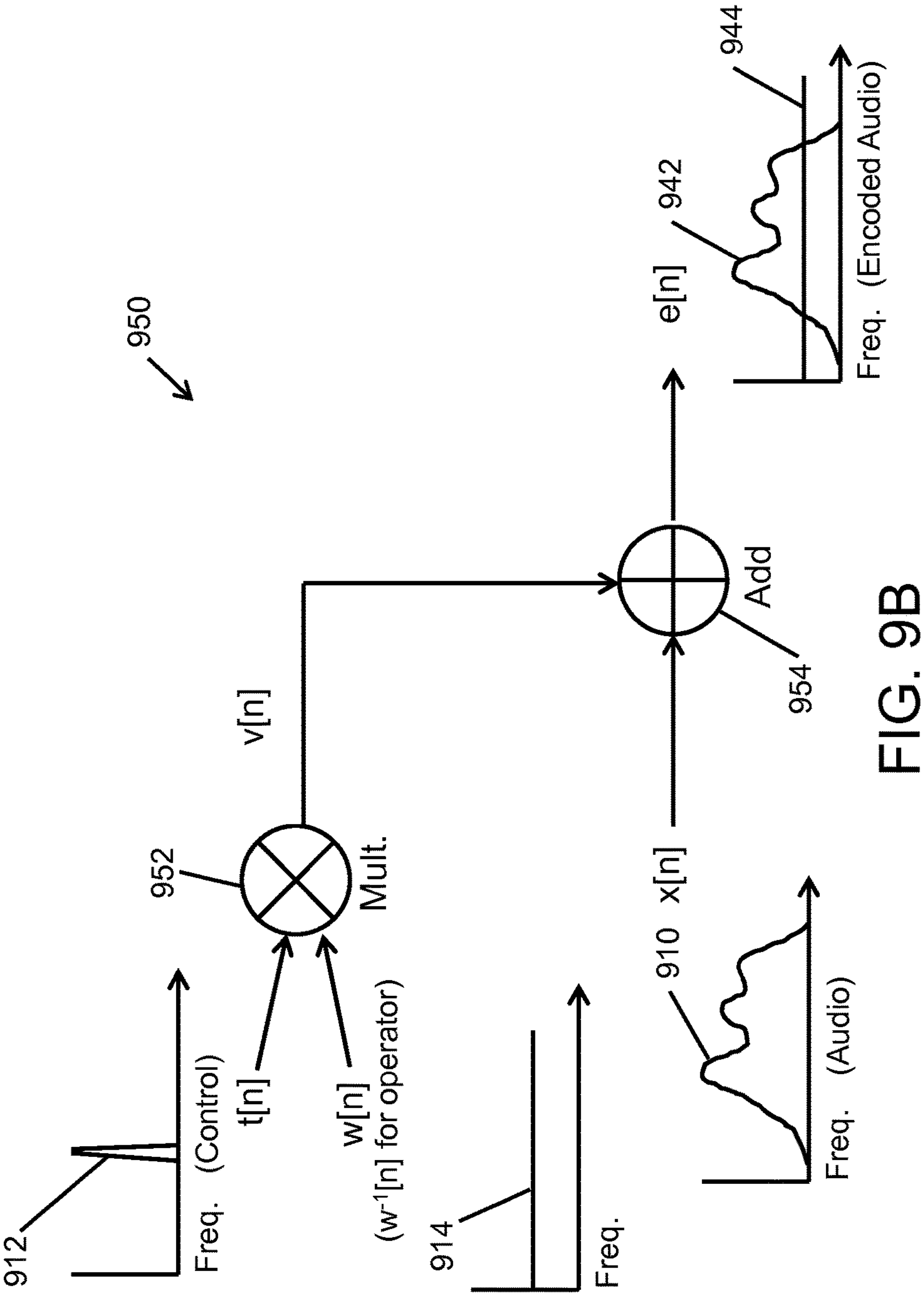
FIG. 9B is a block diagram illustrating a system in accordance with some embodiments of the present invention.

In some embodiments, if the notch filter 920 is not used then the system 900 in FIG. 9A can be simplified. Namely, the system 900 can be simplified based on the above algebra used to define the encoded audio signal e[n]. Specifically, FIG. 9B illustrates an example of a transmit side system 950 that operates in accordance with some embodiments of the present invention. In some embodiments, the transmit side system 950 may be implemented by a processor-based system, such as the processor-based system 110 (FIG. 1).

Specifically, in the system 950 the control signal t[n] (instead of the audio signal x[n]) is multiplied by the two state signal w[n] by the multiplier 952 to form a first resultant signal v[n]. The first resultant signal v[n] is then added to the audio signal x[n] by the adder 954 to form the encoded audio signal e[n]. Thus, the encoded audio signal e[n] generated by the system 950 is represented by the following equation:

$$e[n]=x[n]+w[n]t[n]$$

This equation is the same as what is generated by the system 900 in FIG. 9A when the notch filter 920 is not used. Thus, whether the system 900 or system 950 is used, in some embodiments it can be said that the encoded audio signal e[n] is equal to a sum of the control signal t[n] multiplied by the two state signal w[n] and a signal that is at least partly based on the audio signal x[n]. Stated differently, the encoded audio signal e[n] is equal to a signal that is at least partly based on the audio signal x[n] plus (or added to) the product of the two state signal w[n] and the control signal t[n]. For the system 950, the signal that is at least partly based on the audio signal x[n] is equal to the audio signal x[n].

In some embodiments, the encoded audio signal e[n] represents a modified audio signal that comprises the original audio signal x[n] with the control signal t[n] being embedded therein. In some embodiments, the encoded audio signal e[n] is then sent to an audio delivery device on the receive side, such as the audio delivery apparatus 122 (FIG. 1). In some embodiments, such sending may first involve providing the encoded audio signal e[n] to an audio output interface of the processor-based system 110. Namely, the encoded audio signal e[n] may be provided to an audio output interface of the processor-based system 110. The audio output interface may then send the encoded audio signal e[n] to the audio delivery device on the receive side via a wired or wireless connection.

Figure 10:
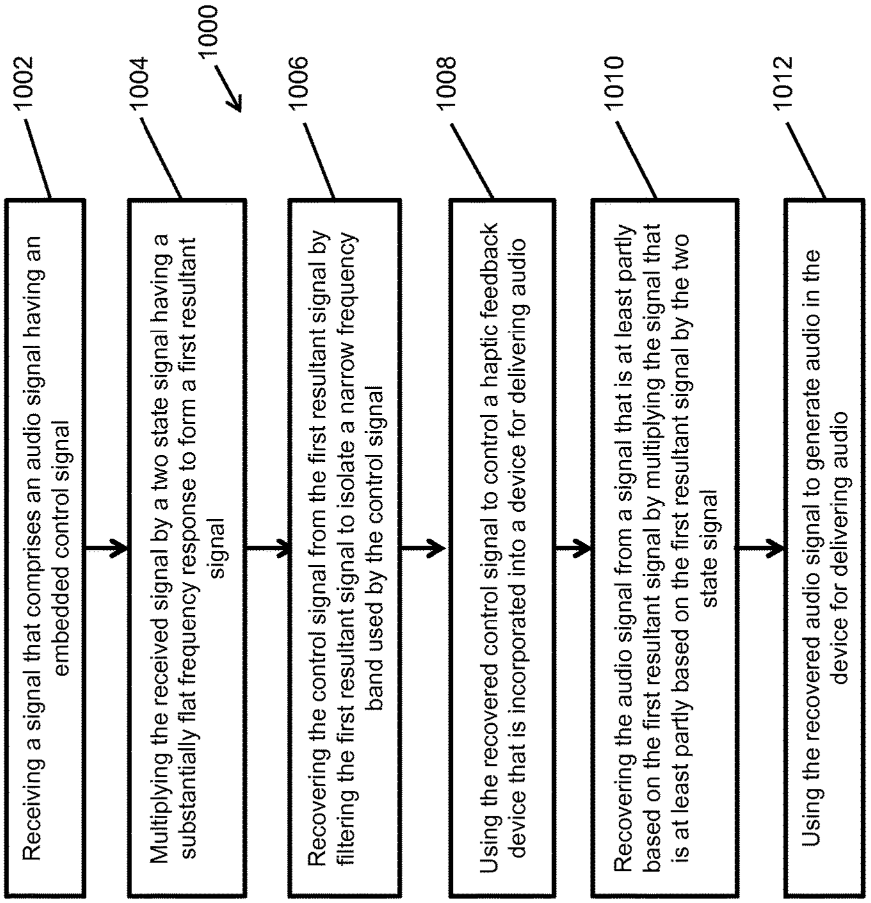
FIG. 10 is a flow diagram illustrating a method in accordance with some embodiments of the present invention.
Figure 11:
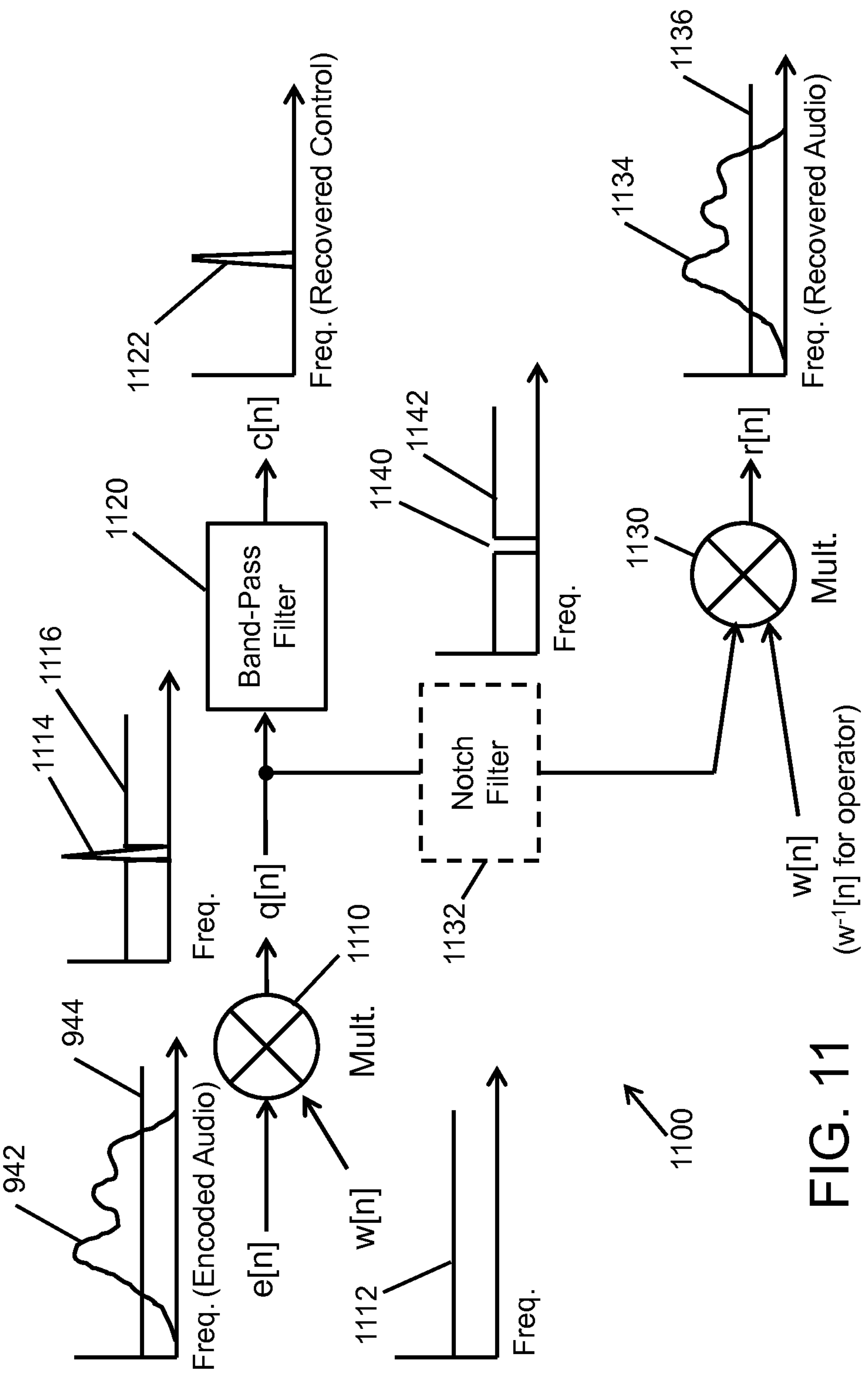
FIG. 11 is a block diagram illustrating a system in accordance with some embodiments of the present invention.

An example of the operation of this technique on the receive side 104 of the system 100 will now be described. FIG. 10 illustrates an example of a method 1000 that operates in accordance with some embodiments of the present invention, and FIG. 11 illustrates an example of a receive side system 1100 that may be used to perform the method 1000 in accordance with some embodiments of the present invention. In some embodiments, the method 1000 and the receive side system 1100 perform a method of decoding the received signal to recover the control signal and the audio signal. In some embodiments, the method 1000 and the receive side system 1100 may be implemented by a device for delivering audio, such as the audio delivery apparatus 122 (FIG. 1).

In step 1002 a signal is received that comprises an audio signal having an embedded control signal. In some embodiments, the received signal may comprise a signal like the encoded audio signal e[n] described above.

In FIG. 11 the received signal is illustrated as the encoded audio signal e[n], which has a corresponding frequency spectrum diagram indicated by 942 and 944. As described above, the original audio signal x[n] is indicated by 942 and rises above a low level noise floor indicated by 944. The low level noise floor indicated by 944 is the product of the control signal t[n] and the two state signal w[n]. That is, as described above, in some embodiments the encoded audio signal e[n] is represented by the following equation (assuming the optional notch filter 920 is not used):

$$e[n]=x[n]+w[n]t[n]$$

In step 1004 the received signal is multiplied by a two state signal having a substantially flat frequency response to form a first resultant signal. In some embodiments, the two state signal is identical to the two state signal that was used on the transmit side. In some embodiments, setting the two state signal to be identical to the two state signal that was used on the transmit side provides the ability (that was discussed above) to recover the original audio signal. In some embodiments, multiplying the received signal by the two state signal before any subsequent processing undoes the effect of the final multiplication during the encode.

In the embodiment illustrated in FIG. 11 this step is performed by the multiplier 1110. Specifically, the encoded audio signal e[n] is provided to the multiplier 1110. A two state signal w[n] is also provided to the multiplier 1110. The two state signal w[n] has a corresponding frequency spectrum diagram indicated by 1112, which indicates it has a substantially flat frequency response.

In the illustrated embodiment, the two state signal w[n] is identical to the two state signal w[n] that was used on the transmit side. As such, in the illustrated embodiment the two state signal w[n] comprises states of positive one and negative one, and comprises a substantially full audio spectrum in the human audible range.

The result of the multiplication of the encoded audio signal e[n] and the two state signal w[n] is the first resultant signal q[n], which has a corresponding frequency spectrum diagram indicated by 1114 and 1116. The first resultant signal q[n] is calculated as follows:

$$q[n]=w[n]e[n]$$

$$q[n]=w[n](x[n]+w[n]t[n])$$

$$q[n]=w[n]x[n]+w^2[n]t[n]$$

Because $w[n]=+1$ or $-1$ (pseudorandomly), it follows that, $$q[n]=w[n]x[n]+t[n]$$

The frequency spectrum diagram illustrates that in some embodiments the first resultant signal q[n] comprises a peak 1114 in a narrow frequency band rising above a substantially flat frequency response 1116. The peak 1114 represents the control signal t[n], and the substantially flat frequency response 1116 represents the noise created by the product of the audio signal x[n] and the two state signal w[n].

In step 1006 the control signal is recovered from the first resultant signal. In some embodiments, the control signal may be recovered by filtering the first resultant signal to isolate a narrow frequency band used by the control signal. In some embodiments, the step of recovering the control signal from the first resultant signal further comprises comparing the peak of the control signal to a threshold.

In the embodiment illustrated in FIG. 11 the filtering is performed by the band-pass filter 1120. Specifically, the band-pass filter 1120 receives the first resultant signal q[n] and passes only the frequencies in the narrow frequency band used by the control signal, and rejects the frequencies outside that range. The result of this filtering is the signal c[n], which has a corresponding frequency spectrum diagram indicated by 1122. In some embodiments, the peak 1122 may be compared to a threshold to determine if the control signal is intended to be active. Thus, in some embodiments, the first resultant signal q[n] is filtered out into just the narrow range, and then it is compared to a threshold, which is typically a level above the background noise. In some embodiments, the signal c[n] is used as the recovered control signal.

In some embodiments, the control signal is recovered from the first resultant signal without filtering. As such, the band-pass filter 1120 is not required. Specifically, in some embodiments the first resultant signal q[n] may be used as the recovered control signal. In some embodiments, thresholding may be used for recovery when the control signal peak 1114 has been designed to have greater amplitude than the background white noise 1116 of the scrambled audio signal. In some embodiments, soft thresholding may be used, where the signal is put through a nonlinearity that passes high values almost unchanged and sets low values to zero or almost zero, with some smooth transition in between. In general, any noise-reduction or noise-removal technique may be used for recovering the control signal.

In step 1008 the recovered control signal is used to control one or more haptic feedback devices that are incorporated into a device for delivering audio. For example, in some embodiments the recovered control signal may be used to control the one or more haptic feedback devices 128 and 130 that are incorporated into the audio delivery apparatus 122 (FIG. 1).

In step 1010 the audio signal is recovered from a signal that is at least partly based on the first resultant signal by multiplying the signal that is at least partly based on the first resultant signal by the two state signal. As mentioned above, in some embodiments, the two state signal is identical to the two state signal that was used on the transmit side, which provides the ability to recover the original audio signal.

In the embodiment illustrated in FIG. 11 this step is performed by the multiplier 1130. The following explanation will initially disregard the illustrated notch filter 1132, which is an optional feature. Assuming the notch filter 1132 is not present, the first resultant signal q[n] is multiplied by the two state signal w[n] by the multiplier 1130. That is, the first resultant signal q[n] is provided to the multiplier 1130, and the two state signal w[n] is provided to the multiplier 1130. The two state signal w[n] is identical to the two state signal w[n] on the transmit side and has a corresponding frequency spectrum diagram indicated by 1112, which indicates it has a substantially flat frequency response. The result of the multiplication of the first resultant signal q[n] and the two state signal w[n] is the signal r[n], which has a corresponding frequency spectrum diagram indicated by 1134 and 1136. In some embodiments, the signal r[n] is used as the recovered audio signal.

In some embodiments, the recovered audio signal r[n] is calculated as follows:

$$r[n]=w[n]q[n]$$

$$r[n]=w[n](w[n]x[n]+t[n])$$

$$r[n]=w^2[n]x[n]+w[n]t[n]$$

Because $w[n]=+1$ or $-1$ (pseudorandomly), it follows that, $$r[n]=x[n]+w[n]t[n]$$

Thus, the recovered audio signal r[n] is equal to the original audio signal x[n] plus the original control signal t[n] multiplied by the two state signal w[n]. As explained above, the two state signal w[n] represents pseudorandom white noise. As such, the product of the control signal t[n] and the two state signal w[n] is white noise. Therefore, in the frequency spectrum diagram for the signal r[n], the original audio signal x[n] is indicated by 1134 and rises above a low level noise floor indicated by 1136. The low level noise floor indicated by 1136 is the product of the control signal t[n] and the two state signal w[n].

Thus, the result is that the control signal t[n] is basically scrambled with white noise (i.e. w[n]) and then added to the original audio signal x[n], resulting in the original audio signal x[n] plus some noise. The noise is obtained because the peak 1114 turns into flat noise after the multiplication 1130. It is believed that the low level noise floor indicated by 1136 will be quiet enough that most users will either not hear it, not notice it, and/or will not be bothered by it. The noise floor can be kept at a low level if the pseudo white noise signal w[n] is kept below a threshold at which humans cannot hear it or do not notice it.

As mentioned above, the illustrated notch filter 1132 is an optional feature that may be used in some embodiments. When used, the notch filter 1132 is configured to filter the first resultant signal q[n] in the narrow frequency band where the control signal t[n] was inserted. The result of this filtering is illustrated by the frequency spectrum diagram indicated by 1140 and 1142. A notch 1140 is created in the substantially flat frequency response 1142 of the first resultant signal q[n]. The notch 1140 is created in the narrow frequency band where the peak 1114 of the control signal t[n] was located. By filtering out the signal in the notch 1140, the peak 1114 is removed, which helps to reduce the noise floor 1136 in the recovered audio signal r[n]. This is because, as discussed above, the low level noise floor indicated by 1136 is the product of the control signal t[n] and the two state signal w[n]. If the peak 1114 created by the control signal t[n] is reduced or eliminated, the result of the multiplication 1130 will be a reduced noise floor 1136.

If the notch filter 1132 is used, then the signal that is provided to the multiplier 1130 will be a filtered version of the first resultant signal q[n]. Thus, in some embodiments it can be said that the signal that is provided to the multiplier 1130 is at least partly based on the first resultant signal q[n] because it is a filtered version of the first resultant signal q[n]. If the notch filter 1132 is not used, then the signal that is provided to the multiplier 1130 will be the first resultant signal q[n]. In some embodiments, it can still be said that the signal that is provided to the multiplier 1130 is at least partly based on the first resultant signal q[n] because the signal that is provided to the multiplier 1130 is the first resultant signal q[n]. Therefore, in some embodiments, whether or not the notch filter 1132 is used, the audio signal is recovered by multiplying a signal that is at least partly based on the first resultant signal q[n] by the two state signal w[n].

In some embodiments, the steps of recovering the control and audio signals from the received encoded audio signal e[n] further comprises the step of synchronizing the two state signal w[n] with the identical two state signal w[n] that was used on the transmit side. That is, in some embodiments, w[n] on the receive side needs to be synchronized with w[n] on the transmit side. Any method of synchronization may be used.

In some embodiments, one method of synchronization that may be used is to embed a marker signal along with the original haptics control signal t[n]. The marker signal may be embedded in a different frequency band, or in a certain time slice. For example, a pulse may be inserted every second, every other second, or at some other timing. When the recovered control signal c[n] is obtained, it will include the marker at some regular pattern. The two state signal w[n] may then be time shifted until it matches the marker signal found in the recovered control signal c[n]. Eventually one of the time shifts will be the correct one. If an incorrect time shift is used, the multiplication of the received signal e[n] and w[n] will produce white noise because w[n] will not be equal to w[n] on the transmit side.

Finally, in step 1012 the recovered audio signal is used to generate audio in the device for delivering audio. For example, in some embodiments the recovered audio signal r[n] may be used to generate audio in the audio delivery apparatus 122 (FIG. 1).

Thus, in some embodiments the receive side receives a signal that comprises an audio signal having an embedded control signal. The control signal is recovered from the received signal by using a pseudorandom signal. By way of example, in some embodiments, the pseudorandom signal may comprise a two state signal as described above. In some embodiments, the pseudorandom signal may comprise a signal having pseudorandom invertible operators as values, which will be discussed below.

In some embodiments, the recovering the control signal from the received signal by using a pseudorandom signal comprises multiplying the received signal by the pseudorandom signal to form a first resultant signal, and then recovering the control signal from the first resultant signal. In some embodiments, the control signal is recovered by filtering the first resultant signal to isolate a narrow frequency band used by the control signal. In some embodiments, the first resultant signal comprises a peak in the narrow frequency band rising above a substantially flat frequency response, and the recovering the control signal from the first resultant signal further comprises comparing the peak to a threshold.

In some embodiments, recovering the audio signal from the received signal comprises multiplying the received signal by the pseudorandom signal to form a first resultant signal, and then recovering the audio signal from a signal that is at least partly based on the first resultant signal by multiplying the signal that is at least partly based on the first resultant signal by the pseudorandom signal. In some embodiments, the signal that is at least partly based on the first resultant signal comprises the first resultant signal. In some embodiments, the signal that is at least partly based on the first resultant signal comprises a filtered version of the first resultant signal.

In some embodiments of the above-described techniques, the transformation from the transmit side to the receive side is capable of preserving energy. Specifically, on the transmit side the energy of the original audio signal x[n] is a product of its amplitude and its bandwidth. That energy gets converted to white noise by the multiplication 916 (FIG. 9A). The white noise gets spread out across the frequency spectrum in the first resultant signal y[n]. At any one frequency the peak is much lower than the original signal. As such, the audio signal x[n] essentially trades peak for width, or stated differently, the energy gets spread out.

On the receive side, the received signal e[n] (FIG. 11) includes a certain amount of energy, much of which is used for the control signal portion 1114 in the first resultant signal q[n]. That energy is essentially turned into noise when the received signal e[n] is multiplied by the two state signal w[n] to form the first resultant signal q[n]. One potential downside of this is that a noise floor is created in the resulting audio signal. However, in some embodiments the two state signal w[n] is preferably kept low enough such that humans cannot hear or do not notice the resulting noise. If the resulting noise is loud enough to be heard or is in the human audible range, then it will typically cause a low level hiss that is not noticeable or that humans do not care about. In some embodiments, the data rate can be increased by increasing the level of the white noise. As such, one limitation on data rate is that the white noise cannot be too wide or high before the noise hiss gets too annoying. In some embodiments, the noise can be filtered out, but such filtering can possibly add artifacts.

As discussed above, a pseudorandom signal is used in some embodiments to represent a low level pseudorandom white noise that survives the transmission process from the transmit side to the receive side. In much of the above description it has been assumed that the type of pseudorandom signal used to encode and decode the audio signal comprises a two state signal. But as mentioned above, different types of pseudorandom signals may be used. For example, in some embodiments, the pseudorandom signal may comprise a signal having values that are pseudorandom invertible operators. In some embodiments, a two state signal comprises a simple case of a signal having pseudorandom invertible operators as values. As such, in some embodiments, a signal having values that are pseudorandom invertible operators encompasses the case of a two state signal.

The following discussion will explain some reasons and advantages of using pseudorandom invertible operators as values of the pseudorandom signal in some embodiments. Specifically, in some embodiments the original audio signal x[n] may comprise a vector. That is, the audio signal at every sample is a vector number rather than a single number. Representing the audio signal as a vector may be advantageous for doing block-based processing, where at each block the audio is considered as a vector. Representing the audio signal as a vector may also be advantageous for accommodating multichannel audio like stereo or surround sound where every sample carried includes two numbers for left and right channels for stereo, or even additional channels for surround sound. Thus, in some embodiments the original audio signal x[n] may include two or more audio channels, in which case the original audio signal x[n] may be represented as a vector. Of course, in some embodiments the original audio signal x[n] may include only one audio channel.

In some embodiments when the audio signal x[n] comprises a vector, the above-described algorithm and techniques of FIGS. 8-11 can generalize to such vector valued signals or block-processed signals by using a signal with pseudorandom unitary operators as values as the pseudorandom signal instead of a two state signal with pseudorandom values +/−1. That is, in some embodiments, the type of pseudorandom signal that is used is a signal with pseudorandom unitary operators as values. A unitary operator is a matrix, which preserves the length of vectors and is invertible. Thus, instead of multiplying the audio signal x[n] by a number such as +/−1, the audio signal x[n] is multiplied by a matrix. When the audio signal x[n] is a vector, multiplying it by a matrix produces another vector.

Thus, in some embodiments, the pseudorandom signal w[n] in FIGS. 8-11 may comprise a signal having values that are unitary operators. As such, in some embodiments, the references in FIGS. 8-11 to a two state signal are replaced with references to a signal whose values are unitary operators. Similarly, in some embodiments, the references in FIGS. 8-11 to the two-state signal w[n] having the property $w^2[n]=1$ are replaced with references to a unitary signal w[n] and its inverse $w^{-1}[n]$.

In some embodiments, the use in FIGS. 8-11 of a signal w[n] having values that are unitary operators provides a result that is similar to the above-described two state signal which provided the ability to recover the original audio signal x[n] by again multiplying by the two state signal. Specifically, as mentioned above, a unitary operator is a matrix, which preserves the length of vectors and is invertible. Furthermore, multiplying a matrix by its inverse implements the identity property. For example, if an original matrix is A, and the inverse is B, then it follows that A*B is the identity, which returns the same vector that was used as the argument. Thus, if the audio signal vector x[n] is multiplied by matrix A, then multiplying the result by the inverse matrix B will return the original audio signal vector x[n]. As such, a unitary operator and its inverse provides the ability to recover an audio signal, which is similar to the above-described two-state signal w[n] having the property $w^2[n]=1$.

As mentioned above, a unitary operator is a matrix, which preserves the length of vectors and is invertible. In some embodiments, the operators used as the values of the pseudorandom signal w[n] in FIGS. 8-11 do not have to be unitary as long as they have in inverse. Specifically, using a unitary matrix for the pseudorandom signal w[n] can have engineering benefits, such as the volume of the signal will remain somewhat constant overall. Furthermore, using a matrix that is not unitary can possibly lead to numerical issues with balancing the original audio and the scrambled control signal. Nevertheless, in some embodiments, the matrices used for the values of the pseudorandom signal w[n] do not have to be unitary provided they have an inverse. The term invertible operators as used herein refers to both unitary operators and operators that have an inverse but which are not necessarily unitary. Therefore, in some embodiments, unitary operators may be used for the pseudorandom signal w[n]. In some embodiments, invertible operators may be used for the pseudorandom signal w[n].

It is also noted that a two state signal with pseudorandom values +/−1 comprises a simple case of a signal having unitary operators as values. That is, $w^2=1$ is a simple version of a unitary operator. More specifically, in some embodiments, such a two state signal comprises a signal having unitary operators as values wherein each unitary operator comprises a one element matrix. Because the values of the two state signal can be considered to be unitary operators, the values of the two state signal can also be considered to be invertible operators. Therefore, as mentioned above, in some embodiments a signal having values that are pseudorandom invertible operators encompasses the case of a two state signal. That is, the pseudorandom values +/−1 are considered to be pseudorandom invertible operators.

It was mentioned above that representing the audio signal as a vector can have benefits with stereo signals or surround sound signals. For stereo signals, if unitary operators are used for the pseudorandom signal w[n], then in some embodiments the unitary operators may each comprise a pseudorandom complex number of magnitude 1. Such pseudorandom unitary operators would also be considered pseudorandom invertible operators. However, it should be understood that other types of unitary operators and invertible operators may be used.

A description of the transmit side system 900 of FIG. 9A will now be provided for embodiments that use invertible operators as the values of the pseudorandom signal w[n]. In general, in some embodiments the operation of the transmit side system 900 is basically the same as described above, except that the inverse operators of the pseudorandom signal are used by the multiplier 940.

Specifically, referring to FIG. 9A, in some embodiments the pseudorandom signal w[n] comprises a signal having values that are pseudorandom invertible operators. Such a signal comprises another example of the aforementioned low level pseudorandom white noise signal that is used to hide the haptics control signal in the audio signal. At each sample there is an invertible matrix or invertible linear operator. In some embodiments, the values are made pseudorandom by choosing from a collection of such operators in a pseudorandom manner at each sample.

In some embodiments, the original audio signal x[n] comprises a vector at each sample. For example, as mentioned above, in some embodiments the original audio signal x[n] may include two or more audio channels, in which case the original audio signal x[n] may be represented as a vector. When the audio signal x[n] is multiplied by the pseudorandom invertible operator signal w[n] by the multiplier 916, the result is to create white noise, which is illustrated as the first resultant signal y[n]. The first resultant signal y[n] also comprises a vector at each sample. It should be understood, however, that in some embodiments the original audio signal x[n] does not have to comprise a vector at each sample. Namely, in some embodiments a non-vector audio signal x[n] will also work when the pseudorandom signal w[n] comprises a signal having values that are pseudorandom invertible operators. For example, in some embodiments such a non-vector audio signal x[n] may comprise an audio signal x[n] having only one audio channel.

The operation of the notch filter 920 and the addition of the control signal t[n] by the adder 922 operate basically the same as described above, with the result that the second resultant signal s[n] also comprises a vector at each sample.

After the control signal is added, the result is multiplied by the inverse of the pseudorandom invertible operator signal. That is, the result is multiplied by the inverse operators of the pseudorandom signal. Specifically, the final multiplication 940 operates somewhat differently than what was described above. The second resultant signal s[n] is multiplied by the inverse of the pseudorandom invertible operator signal w[n], which is denoted $w^{-1}[n]$. This is because, as described above, an operator and its inverse provide the ability to recover the audio signal, similar to the two-state signal w[n] having the property $w^2[n]=1$. Thus, in FIG. 9A the notation "$w_{-1}[n]$ for operator" is used next to the multiplier 940 for embodiments where invertible operators are used for the pseudorandom signal.

The multiplication 940 forms the encoded audio signal e[n], which also comprises a vector at each sample. The corresponding frequency spectrum diagram of the encoded audio signal e[n] is still indicated by 942 and 944. The multiplication by $w^{-1}[n]$ results in an audio signal 942 which is close to the original signal, with a scrambled version 944 of the control signal added thereto. This result is similar to the results described above for the two state signal.

Thus, in some embodiments, the transmit side system 900 operates by transforming the original audio signal to a different domain by multiplying it by a signal having values that are pseudorandom invertible operators. The control signal is then added. Then the signal is transformed back by multiplying by the inverse of the pseudorandom invertible operator signal, that is by multiplying by the inverse operators of the pseudorandom signal. The result is the original audio signal plus the scrambled control signal added thereto. One benefit is that if a user listens to the encoded audio signal without any decoding, it should be reasonably good audio with just some low level white noise, which is believed to be unobjectionable.

For embodiments in which invertible operators are used for the pseudorandom signal w[n], and assuming the optional notch filter 920 is not used, the encoded audio signal is calculated as follows:

$$e[n]=w^{-1}[n]s[n]$$

$$e[n]=w^{-1}[n](y[n]+t[n])$$

$$e[n]=w^{-1}[n](x[n]w[n]+t[n])$$

Because $w^{-1}[n]w[n]=1$, it follows that, $$e[n]=x[n]+w^{-1}[n]t[n]$$

Thus, the encoded audio signal e[n] is equal to the original audio signal x[n] plus the original control signal t[n] multiplied by the inverse of the pseudorandom invertible operator signal w[n] (i.e. $w^{-1}[n]$). As explained above, the pseudorandom invertible operator signal w[n] represents pseudorandom white noise. As such, the product of the control signal t[n] and $w^{-1}[n]$ is white noise.

If the notch filter 920 is used the encoded audio signal e[n] is calculated as follows:

$$e[n]=w^{-1}[n]s[n]$$

$$e[n]=w^{-1}[n]((y[n])_{filtered}+t[n])$$

$$e[n]=w^{-1}[n]((x[n]w[n])_{filtered}+t[n])$$

$$e[n]=w^{-1}[n](x[n]w[n])_{filtered}+w^{-1}[n]t[n]$$

Because of the notch filtering there is no ($w^{-1}[n]w[n]=1$) that easily drops out of the second term (i.e. $w^{-1}[n](x[n]w[n])_{filtered}$) of the equation to leave only the audio signal x[n]. Instead, in some embodiments, the second term of the equation comprises a signal that is at least partly based on the audio signal x[n]. Thus, in some embodiments, it can be said that the encoded audio signal e[n] is equal to a sum of the control signal t[n] multiplied by the inverse of the pseudorandom invertible operator signal w[n] (i.e. $w^{-1}[n]$) and a signal that is at least partly based on the audio signal x[n]. Stated differently, the encoded audio signal e[n] is equal to a signal that is at least partly based on the audio signal x[n] plus (or added to) the product of the control signal t[n] and the inverse of the pseudorandom invertible operator signal w[n] (i.e. $w^{-1}[n]$).

Because the audio signal x[n] itself is a signal that is at least partly based on the audio signal x[n], then in some embodiments it can be said that the encoded audio signal e[n] is equal to a sum of the control signal t[n] multiplied by the inverse of the pseudorandom invertible operator signal w[n] (i.e. $w^{-1}[n]$) and a signal that is at least partly based on the audio signal x[n], whether or not the notch filter 920 is used. Stated differently, the encoded audio signal e[n] is equal to a signal that is at least partly based on the audio signal x[n] plus (or added to) the product of the control signal t[n] and the inverse of the pseudorandom invertible operator signal w[n] (i.e. $w^{-1}[n]$), whether or not the notch filter 920 is used. This is because, in some embodiments, when the notch filter 920 is not used the signal that is at least partly based on the audio signal x[n] is equal to the audio signal x[n].

A description of the transmit side system 950 of FIG. 9B will now be provided for embodiments that use pseudorandom invertible operators as values of the pseudorandom signal w[n]. As mentioned above, the transmit side system 950 is a simplified version of the transmit side system 900 when the notch filter 920 is not used. In general, in some embodiments the operation of the transmit side system 950 is basically the same as described above, except that the inverse operators of the pseudorandom signal are used by the multiplier 952.

Specifically, referring to FIG. 9B, in some embodiments the pseudorandom signal w[n] comprises a signal having values that are pseudorandom invertible operators. As described above, such a signal comprises another example of the aforementioned low level pseudorandom white noise signal that is used to hide the haptics control signal in the audio signal. At each sample there is an invertible matrix or invertible linear operator. In some embodiments, the values are made pseudorandom by choosing from a collection of such operators in a pseudorandom manner at each sample. And in some embodiments, the original audio signal x[n] comprises a vector at each sample. But in some embodiments, the original audio signal x[n] does not have to comprise a vector at each sample.

The operation of the transmit side system 950 begins with the first multiplication 952, which operates somewhat differently than what was described above. Specifically, the control signal t[n] is multiplied by the inverse of the pseudorandom invertible operator signal w[n], which is denoted $w^{-1}[n]$. This multiplication is performed by the multiplier 952, and as such, in FIG. 9B the notation "$w^{-1}[n]$ for operator" is used next to the multiplier 952 for embodiments where invertible operators are used for the pseudorandom signal. The multiplier 952 forms the first resultant signal v[n], which is then added to the audio signal x[n] by the adder 954 to form the encoded audio signal e[n].

Thus, the encoded audio signal e[n] generated by the system 950 when invertible operators are used for the pseudorandom signal w[n] is represented by the following equation:

$$e[n]=x[n]+w^{-1}[n]t[n]$$

This equation is the same as what is generated by the system 900 in FIG. 9A when the notch filter 920 is not used and invertible operators are used for the pseudorandom signal w[n]. Thus, whether the system 900 or system 950 is used, in some embodiments it can be said that the encoded audio signal e[n] is equal to a sum of the control signal t[n] multiplied by the inverse of the pseudorandom invertible operator signal w[n] (i.e. $w^{-1}[n]$) and a signal that is at least partly based on the audio signal x[n]. Stated differently, the encoded audio signal e[n] is equal to a signal that is at least partly based on the audio signal x[n] plus (or added to) the product of the control signal t[n] and the inverse of the pseudorandom invertible operator signal w[n] (i.e. $w^{-1}[n]$). This is because the audio signal x[n] itself is a signal that is at least partly based on the audio signal x[n]. That is, for the system 950, the signal that is at least partly based on the audio signal x[n] is the audio signal x[n].

A description of the receive side system 1100 of FIG. 11 will now be provided for embodiments that use invertible operators for the pseudorandom signal w[n]. In general, in some embodiments the operation of the receive side system 1100 is basically the same as described above, except that the inverse operators of the pseudorandom signal are used by the multiplier 1130.

Specifically, referring to FIG. 11 the received signal is illustrated as the encoded audio signal e[n], which has a corresponding frequency spectrum diagram indicated by 942 and 944. As described above, the encoded audio signal e[n], which is formed by the multiplication 940 of the transmit side system 900, comprises a vector at each sample. For example, in some embodiments the encoded audio signal e[n] may include two or more audio channels. In some embodiments, the encoded audio signal e[n] may include only one audio channel.

As also described above, when invertible operators are used for the pseudorandom signal w[n], the encoded audio signal e[n] is represented by the following equation:

$$e[n]=x[n]+w^{-1}[n]t[n]$$

In some embodiments, the first step for the system 1100 is that the received encoded audio signal e[n] is multiplied by the pseudorandom invertible operator signal w[n] by the multiplier 1110. In some embodiments, the pseudorandom invertible operator signal w[n] is identical to the pseudorandom invertible operator signal w[n] that was used on the transmit side. In some embodiments, setting the pseudorandom invertible operator signal w[n] to be identical to the pseudorandom invertible operator signal w[n] that was used on the transmit side provides the ability (that was discussed above) to recover the original audio signal. In some embodiments, multiplying the received encoded audio signal e[n] by the pseudorandom invertible operator signal w[n] before any subsequent processing undoes the effect of the final multiplication during the encode. The result of the multiplication of the encoded audio signal e[n] and the pseudorandom invertible operator signal w[n] is the first resultant signal q[n], which also comprises a vector at each sample. The first resultant signal q[n] is calculated as follows:

$$q[n]=w[n]e[n]$$

$$q[n]=w[n](x[n]+w^{-1}[n]t[n])$$

Because $w^{-1}[n]w[n]=1$, it follows that, $$q[n]=w[n]x[n]+t[n]$$

The first resultant signal q[n] has a corresponding frequency spectrum diagram indicated by 1114 and 1116.

The control signal c[n] is recovered from the first resultant signal q[n] in substantially the same manner as described above. Namely, in some embodiments the band-pass filter 1120 filters the first resultant signal q[n] to isolate a narrow frequency band used by the control signal. However, as discussed above, filtering is not used in some embodiments, which means the band-pass filter 1120 is not required. For example, in some embodiments, thresholding may be used for recovery when the control signal peak 1114 has been designed to have greater amplitude than the background white noise 1116 of the scrambled audio signal. In some embodiments the haptics control signal is recovered from the first resultant signal by applying a noise reduction or signal detection technique.

Next, the audio signal is recovered from a signal that is at least partly based on the first resultant signal q[n]. The following explanation will initially disregard the illustrated notch filter 1132, which is an optional feature. Assuming the notch filter 1132 is not present, the first resultant signal q[n] is multiplied by the inverse of the pseudorandom invertible operator signal w[n], which is denoted $w^{-1}[n]$. This multiplication is performed by the multiplier 1130. In FIG. 11 the notation "$w^{-1}[n]$ for operator" is used next to the multiplier 1130 for embodiments where invertible operators are used for the pseudorandom signal.

As mentioned above, in some embodiments, the pseudorandom invertible operator signal w[n] is identical to the pseudorandom invertible operator signal w[n] used on the transmit side. The result of the multiplication 1130 of the first resultant signal q[n] and $w^{-1}[n]$ is the signal r[n], which also comprises a vector at each sample, and which has a corresponding frequency spectrum diagram indicated by 1134 and 1136. In some embodiments, the signal r[n] is used as the recovered audio signal.

In some embodiments, when invertible operators are used for the pseudorandom signal w[n], and the notch filter 1132 is disregarded, the recovered audio signal r[n] is calculated as follows:

$$r[n]=w^{-}[n]q[n]$$

$$r[n]=w^{-1}[n](w[n]x[n]+t[n])$$

Because $w^{-1}[n]w[n]=1$, it follows that, $$r[n]=x[n]+w^{-1}[n]t[n]$$

Thus, the recovered audio signal r[n] is equal to the original audio signal x[n] plus the original control signal t[n] multiplied by the inverse of the pseudorandom invertible operator signal w[n], which is denoted $w^{-1}[n]$. As explained above, the pseudorandom invertible operator signal w[n] represents pseudorandom white noise. As such, the product of the control signal t[n] and $w^{-1}[n]$ is white noise. Therefore, in the frequency spectrum diagram for the signal r[n], the original audio signal x[n] is indicated by 1134 and rises above a low level noise floor indicated by 1136. The low level noise floor indicated by 1136 is the product of the control signal t[n] and $w^{-1}[n]$. Thus, similar to as described above, the result is that the control signal t[n] is basically scrambled with white noise (i.e. $w^{-1}[n]$) and then added to the original audio signal x[n], resulting in the original audio signal x[n] plus some noise.

When used, the optional notch filter 1132 operates in substantially the same manner as described above. As such, if the notch filter 1132 is used, then the signal that is provided to the multiplier 1130 will be a filtered version of the first resultant signal q[n]. Thus, in some embodiments, whether or not the notch filter 1132 is used, it can be said that the signal that is provided to the multiplier 1130 is at least partly based on the first resultant signal q[n]. Therefore, in some embodiments, whether or not the notch filter 1132 is used, the audio signal is recovered by multiplying a signal that is at least partly based on the first resultant signal q[n] by the inverse of the pseudorandom invertible operator signal w[n], which is denoted $w^{-1}[n]$.

Similar to as described above, in some embodiments, the steps of recovering the control and audio signals from the received encoded audio signal e[n] further comprises the step of synchronizing the pseudorandom invertible operator signal w[n] with the identical pseudorandom invertible operator signal w[n] that was used on the transmit side. Any method of synchronization may be used, such as for example the method described above.

It is noted that the notation "$w^{-1}[n]$ for operator" in FIGS. 9A, 9B and 11 is also valid for embodiments that use the above-described two state signal w[n], i.e. that use pseudorandom values +/−1 for the pseudorandom signal w[n]. Specifically, if w[n] is equal to only +1 or −1, then $w[n]=w^{-1}[n]$. Thus, for embodiments that use the above-described two state signal w[n], using $w^{-1}[n]$ in the multipliers 940 (FIG. 9A), 952 (FIG. 9B), and 1130 (FIG. 11) will provide the same result.

As mentioned above, the audio signal x[n] may include one or more audio channels. Multiple audio channels may be used to accommodate stereo, surround sound, etc. By way of example, in some embodiments the above-described two state signal w[n] is used when the audio signal x[n] includes only one audio channel. In some embodiments, the pseudorandom invertible operator signal w[n] is used when the audio signal x[n] includes two or more audio channels. Thus, in some embodiments the methods and techniques described herein may be applied to single channel audio signals as well as multichannel audio signals, such as for example stereo signals, surround sound signals, etc.

In some embodiments, the methods and techniques described herein may be utilized, implemented and/or run on many different types of processor based apparatuses or systems. For example, the methods and techniques described herein may be utilized, implemented and/or run on computers, servers, game consoles, entertainment systems, portable devices, pad-like devices, audio delivery devices and systems, etc. Furthermore, in some embodiments the methods and techniques described herein may be utilized, implemented and/or run in online scenarios or networked scenarios, such as for example, in online games, online communities, over the Internet, etc.

Figure 12:
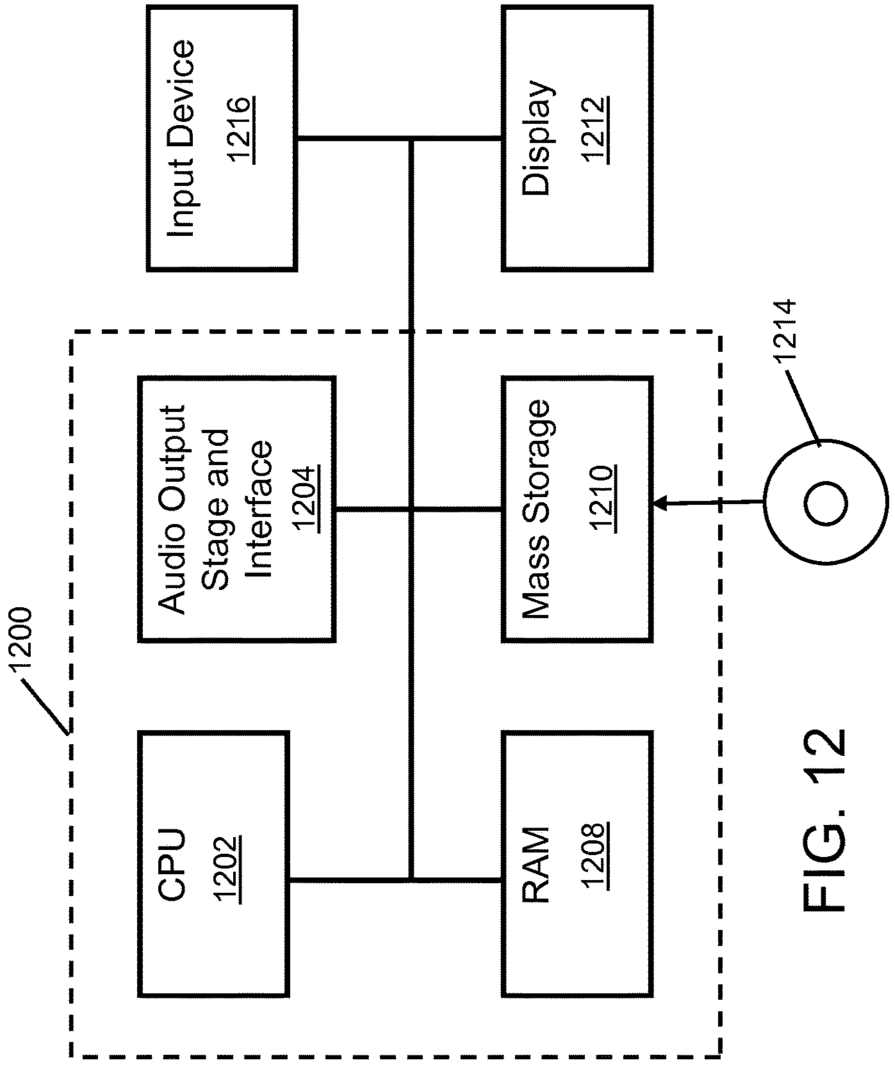
FIG. 12 is a block diagram illustrating a computer or other processor based apparatus/system that may be used to run, implement and/or execute any of the methods and techniques shown and described herein in accordance with some embodiments of the present invention.

Referring to FIG. 12, there is illustrated an example of a processor based apparatus or system 1200 that may be used for any such implementations. In some embodiments, one or more components of the processor based apparatus or system 1200 may be used for implementing any method, system, or device mentioned above, such as for example any of the above-mentioned computers, servers, game consoles, entertainment systems, portable devices, pad-like devices, audio delivery devices, systems and apparatuses, etc. However, the use of the processor based apparatus or system 1200 or any portion thereof is certainly not required. In some embodiments, the processor based apparatus or system 1200 may be used for implementing the transmit side 102 of the system 100 (FIG. 1). For example, in some embodiments, the processor based apparatus or system 1200 may be used for implementing the processor-based system 110.

By way of example, the system 1200 (FIG. 12) may include, but is not required to include, a central processing unit (CPU) 1202, an audio output stage and interface 1204, a random access memory (RAM) 1208, and a mass storage unit 1210, such as a disk drive. The system 1200 may be coupled to, or integrated with, any of the other components described herein, such as a display 1212 and/or an input device 1216. In some embodiments, the system 1200 comprises an example of a processor based apparatus or system. In some embodiments, such a processor based apparatus or system may also be considered to include the display 1212 and/or the input device 1216. The CPU 1202 may be used to execute or assist in executing the steps of the methods and techniques described herein, and various program content, images, avatars, characters, players, menu screens, video games, simulations, virtual worlds, graphical user interface (GUI), etc., may be rendered on the display 1212.

In some embodiments, the audio output stage and interface 1204 provides any necessary functionality, circuitry and/or interface for sending audio, a modified audio signal, an encoded audio signal, or a resultant signal as described herein to an external audio delivery device or apparatus, such as the audio delivery apparatus 122 (FIG. 1), or to any other device, system, or apparatus. The audio output stage and interface 1204 may implement and send such audio, modified audio signal, encoded audio signal, or resultant signal via a wired or wireless connection. In some embodiments, the audio output stage and interface 1204 may provide any necessary functionality to assist in performing or executing any of the steps, methods, modifications, techniques, features, and/or approaches described herein.

The input device 1216 may comprise any type of input device or input technique or method. For example, the input device 1216 may comprise a game controller, game pad, joystick, mouse, wand, or other input devices and/or input techniques. The input device 1216 may be wireless or wired, e.g. it may be wirelessly coupled to the system 1200 or comprise a wired connection. In some embodiments, the input device 1216 may comprise means or sensors for sensing and/or tracking the movements and/or motions of a user and/or an object controlled by a user. The display 1212 may comprise any type of display or display device or apparatus.

The mass storage unit 1210 may include or comprise any type of computer readable storage or recording medium or media. The computer readable storage or recording medium or media may be fixed in the mass storage unit 1210, or the mass storage unit 1210 may optionally include removable storage media 1214, such as a digital video disk (DVD), Blu-ray disc, compact disk (CD), USB storage device, floppy disk, or other media. By way of example, the mass storage unit 1210 may comprise a disk drive, a hard disk drive, flash memory device, USB storage device, Blu-ray disc drive, DVD drive, CD drive, floppy disk drive, etc. The mass storage unit 1210 or removable storage media 1214 may be used for storing code or macros that implement the methods and techniques described herein.

Thus, removable storage media 1214 may optionally be used with the mass storage unit 1210, which may be used for storing program or computer code that implements the methods and techniques described herein, such as program code for running the above-described methods and techniques. However, any of the storage devices, such as the RAM 1208 or mass storage unit 1210, may be used for storing such code. For example, any of such storage devices may serve as a tangible non-transitory computer readable storage medium for storing or embodying a computer program or software application for causing a console, system, computer, entertainment system, client, server, or other processor based apparatus or system to execute or perform the steps of any of the methods, code, and/or techniques described herein. Furthermore, any of the storage devices, such as the RAM 1208 or mass storage unit 1210, may be used for storing any needed database(s).

In some embodiments, one or more of the embodiments, methods, approaches, and/or techniques described above may be implemented in one or more computer programs or software applications executable by a processor based apparatus or system. By way of example, such processor based system may comprise the processor based apparatus or system 1200, or a computer, entertainment system, game console, graphics workstation, server, client, portable device, pad-like device, audio delivery device or apparatus, etc. Such computer program(s) or software may be used for executing various steps and/or features of the above-described methods and/or techniques. That is, the computer program(s) or software may be adapted or configured to cause or configure a processor based apparatus or system to execute and achieve the functions described herein. For example, such computer program(s) or software may be used for implementing any embodiment of the above-described methods, steps, techniques, or features. As another example, such computer program(s) or software may be used for implementing any type of tool or similar utility that uses any one or more of the above described embodiments, methods, approaches, and/or techniques. In some embodiments, one or more such computer programs or software may comprise a computer game, video game, role-playing game (RPG), other computer simulation, or system software such as an operating system, BIOS, macro, or other utility. In some embodiments, program code macros, modules, loops, subroutines, calls, etc., within or without the computer program(s) may be used for executing various steps and/or features of the above-described methods and/or techniques. In some embodiments, such computer program(s) or software may be stored or embodied in a non-transitory computer readable storage or recording medium or media, such as any of the tangible computer readable storage or recording medium or media described above. In some embodiments, such computer program(s) or software may be stored or embodied in transitory computer readable storage or recording medium or media, such as in one or more transitory forms of signal transmission (for example, a propagating electrical or electromagnetic signal).

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides one or more non-transitory computer readable storage mediums storing one or more computer programs adapted or configured to cause a processor based apparatus or system to execute steps comprising: generating an audio signal; generating a control signal that is configured to control a haptic feedback device that is incorporated into a device for delivering audio based on the audio signal to a user; and embedding the control signal in the audio signal. As another example, in some embodiments the present invention provides one or more non-transitory computer readable storage mediums storing one or more computer programs adapted or configured to cause a processor based apparatus or system to execute steps comprising: generating an audio signal; generating a control signal that is configured to control a haptic feedback device that is incorporated into a device for delivering audio based on the audio signal to a user; and embedding the control signal in the audio signal by using a pseudorandom signal to form an encoded audio signal.

Figure 13:
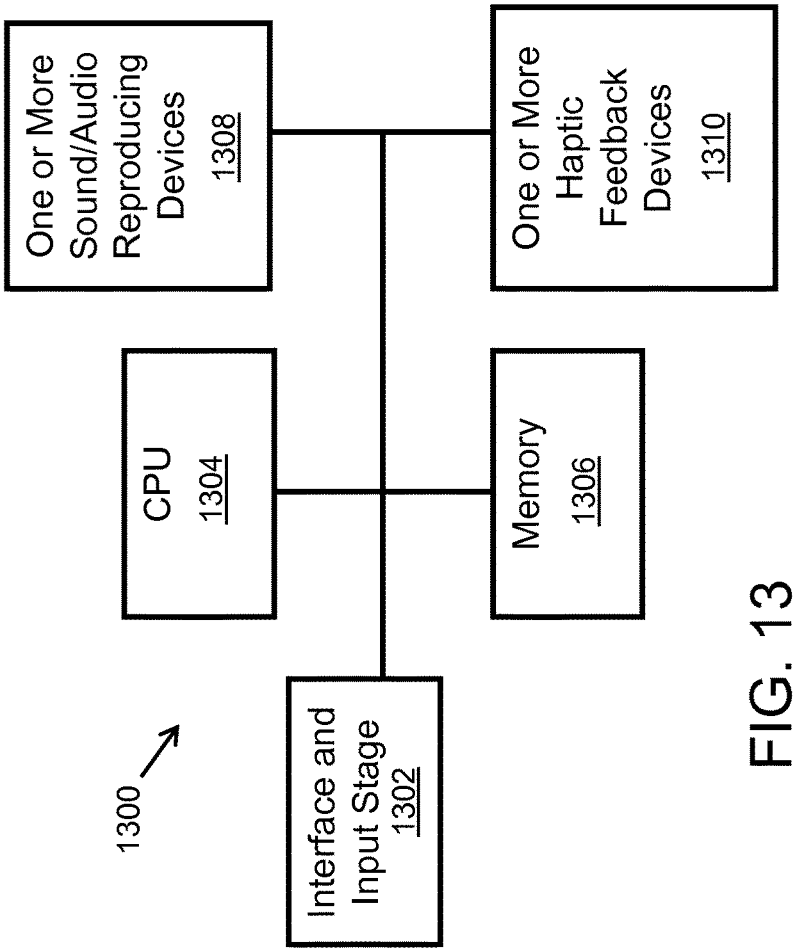
FIG. 13 is a block diagram illustrating another processor based apparatus/system that may be used to run, implement and/or execute methods and techniques shown and described herein in accordance with some embodiments of the present invention.

Referring to FIG. 13, there is illustrated another example of a processor based apparatus or system 1300 that may be used for implementing any of the devices, systems, steps, methods, techniques, features, modifications, and/or approaches described herein. In some embodiments, the processor based apparatus or system 1300 may be used for implementing the receive side 104 of the system 100 (FIG. 1). In some embodiments, the processor based apparatus or system 1300 may be used for implementing the audio delivery apparatus 122. However, the use of the processor based apparatus or system 1300 or any portion thereof is certainly not required.

By way of example, the system 1300 (FIG. 13) may include, but is not required to include, an interface and input stage 1302, a central processing unit (CPU) 1304, a memory 1306, one or more sound reproducing devices 1308, and one or more haptic feedback devices 1310. In some embodiments, the system 1300 comprises an example of a processor based apparatus or system. The system 1300 may be coupled to, or integrated with, or incorporated with, any of the other components described herein, such as an audio delivery device, and/or a device configured to be worn on a human's head and deliver audio to one or both of the human's ears.

In some embodiments, the interface and input stage 1302 is configured to receive wireless communications. In some embodiments, the interface and input stage 1302 is configured to receive wired communications. Any such communications may comprise audio signals, modified audio signals, encoded audio signals, and/or resultant signals as described herein. In some embodiments, the interface and input stage 1302 is configured to receive other types of communications, data, signals, etc. In some embodiments, the interface and input stage 1302 is configured to provide any necessary functionality, circuitry and/or interface for receiving audio signals, modified audio signals, encoded audio signals, and/or resultant signals as described herein from a processor-based apparatus, such as the processor-based system 110 (FIG. 1), or any other device, system, or apparatus. In some embodiments, the interface and input stage 1302 may provide any necessary functionality to assist in performing or executing any of the steps, methods, modifications, techniques, features, and/or approaches described herein.

The CPU 1304 may be used to execute or assist in executing any of the steps of the methods and techniques described herein. The memory 1306 may include or comprise any type of computer readable storage or recording medium or media. The memory 1306 may be used for storing program code, computer code, macros, and/or any needed database(s), or the like, that implement the methods and techniques described herein, such as program code for running the above-described methods and techniques. In some embodiments, the memory 1306 may comprise a tangible non-transitory computer readable storage medium for storing or embodying a computer program or software application for causing the processor based apparatus or system 1300 to execute or perform the steps of any of the methods, code, features, and/or techniques described herein. In some embodiments, the memory 1306 may comprise a transitory computer readable storage medium, such as a transitory form of signal transmission, for storing or embodying a computer program or software application for causing the processor based apparatus or system 1300 to execute or perform the steps of any of the methods, code, features, and/or techniques described herein.

In some embodiments, the one or more sound reproducing devices 1308 may comprise any type of speakers, loudspeakers, earbud devices, in-ear devices, in-ear monitors, etc. For example, the one or more sound reproducing devices 1308 may comprise a pair of small loudspeakers designed to be used close to a user's ears, or they may comprise one or more earbud type or in-ear monitor type speakers or audio delivery devices.

In some embodiments, the one or more haptic feedback devices 1310 may comprise any type of haptic feedback devices. For example, the one or more haptic feedback devices 1310 may comprise devices that are configured to apply forces, vibrations, motions, etc. The one or more haptic feedback devices 1310 may comprise any type of haptic transducer or the like. Furthermore, in some embodiments, the one or more haptic feedback devices 1310 may be configured to operate in close proximity to a user's head in order to apply forces, vibrations, and/or motions to the user's head. In some embodiments, the one or more haptic feedback devices 1310 may be configured or designed to apply any type of forces, vibrations, motions, etc., to the user's head, ears, neck, shoulders, and/or other body part or region. In some embodiments, the one or more haptic feedback devices 1310 are configured to be controlled by a haptic control signal that may be generated by a computer simulation, such as for example a video game.

In some embodiments, the system 1300 may include a microphone. But a microphone is not required, and so in some embodiments the system 1300 does not include a microphone.

In some embodiments, one or more of the embodiments, methods, approaches, and/or techniques described above may be implemented in one or more computer programs or software applications executable by a processor based apparatus or system. By way of example, such processor based system may comprise the processor based apparatus or system 1300. For example, in some embodiments the present invention provides one or more non-transitory computer readable storage mediums storing one or more computer programs adapted or configured to cause a processor based apparatus or system to execute steps comprising: receiving a signal that comprises an audio signal having an embedded control signal; recovering the audio signal from the received signal; using the recovered audio signal to generate audio in a device for delivering audio; recovering the control signal from the received signal; and using the recovered control signal to control a haptic feedback device that is incorporated into the device for delivering audio. As another example, in some embodiments the present invention provides one or more non-transitory computer readable storage mediums storing one or more computer programs adapted or configured to cause a processor based apparatus or system to execute steps comprising: receiving a signal that comprises an audio signal having an embedded control signal; recovering the control signal from the received signal by using a pseudorandom signal; using the recovered control signal to control a haptic feedback device that is incorporated into a device for delivering audio; recovering the audio signal from the received signal; and using the recovered audio signal to generate audio in the device for delivering audio.

While the invention herein disclosed has been described by means of specific embodiments and applications thereof, numerous modifications and variations could be made thereto by those skilled in the art without departing from the scope of the invention set forth in the claims.

What is claimed is:

1. A method, comprising:

generating, by a first device, an audio signal;

generating, by the first device, a control signal that is configured to control a haptic feedback device that is incorporated into a device for delivering audio based on the audio signal to a user, wherein the device for delivering audio with the incorporated haptic feedback device is separate from the first device;

embedding the control signal in the audio signal by using a pseudorandom signal to form an encoded audio signal, wherein the encoded audio signal combines the control signal and the audio signal into one signal; and sending the encoded audio signal from the first device through an audio communication channel to the device for delivering audio;

wherein the embedding the control signal in the audio signal by using a pseudorandom signal to form an encoded audio signal comprises:

generating the encoded audio signal to be equal to a signal that is at least partly based on the audio signal plus a product of the control signal and an inverse of the pseudorandom signal.

2. The method of claim 1, wherein the signal that is at least partly based on the audio signal is equal to the audio signal.

3. The method of claim 1, wherein the pseudorandom signal comprises values comprising pseudorandom invertible operators.

4. The method of claim 3, wherein:

each of the pseudorandom invertible operators comprises a one element matrix; and the pseudorandom invertible operators comprise only two states of positive one and negative one.

5. A method, comprising:

generating an audio signal;

generating a control signal that is configured to control a haptic feedback device that is incorporated into a device for delivering audio based on the audio signal to a user; and embedding the control signal in the audio signal by using a pseudorandom signal to form an encoded audio signal;

wherein the embedding the control signal in the audio signal by using a pseudorandom signal to form an encoded audio signal comprises:

generating the encoded audio signal to be equal to a signal that is at least partly based on the audio signal plus a product of the control signal and an inverse of the pseudorandom signal;

wherein the generating the encoded audio signal to be equal to a signal that is at least partly based on the audio signal plus a product of the control signal and an inverse of the pseudorandom signal comprises:

multiplying the audio signal by the pseudorandom signal to form a first resultant signal;

adding the control signal to the first resultant signal to form a second resultant signal; and multiplying the second resultant signal by the inverse of the pseudorandom signal to form the encoded audio signal.

6. A method, comprising:

generating an audio signal;

generating a control signal that is configured to control a haptic feedback device that is incorporated into a device for delivering audio based on the audio signal to a user; and embedding the control signal in the audio signal by using a pseudorandom signal to form an encoded audio signal;

wherein the embedding the control signal in the audio signal by using a pseudorandom signal to form an encoded audio signal comprises:

generating the encoded audio signal to be equal to a signal that is at least partly based on the audio signal plus a product of the control signal and an inverse of the pseudorandom signal;

wherein the generating the encoded audio signal to be equal to a signal that is at least partly based on the audio signal plus a product of the control signal and an inverse of the pseudorandom signal comprises:

multiplying the audio signal by the pseudorandom signal to form a first resultant signal;

filtering the first resultant signal to form a filtered first resultant signal;

adding the control signal to the filtered first resultant signal to form a second resultant signal; and multiplying the second resultant signal by the inverse of the pseudorandom signal to form the encoded audio signal.

7. A method, comprising:

generating an audio signal;

generating a control signal that is configured to control a haptic feedback device that is incorporated into a device for delivering audio based on the audio signal to a user; and embedding the control signal in the audio signal by using a pseudorandom signal to form an encoded audio signal;

wherein the embedding the control signal in the audio signal by using a pseudorandom signal to form an encoded audio signal comprises:

generating the encoded audio signal to be equal to a signal that is at least partly based on the audio signal plus a product of the control signal and an inverse of the pseudorandom signal;

wherein the generating the encoded audio signal to be equal to a signal that is at least partly based on the audio signal plus a product of the control signal and an inverse of the pseudorandom signal comprises:

multiplying the control signal by the inverse of the pseudorandom signal to form a first resultant signal; and adding the audio signal to the first resultant signal to form the encoded audio signal.

8. A non-transitory computer readable storage medium storing one or more computer programs configured to cause a processor based system to execute steps comprising:

generating, by a first device, an audio signal;

generating, by the first device, a control signal that is configured to control a haptic feedback device that is incorporated into a device for delivering audio based on the audio signal to a user, wherein the device for delivering audio with the incorporated haptic feedback device is separate from the first device;

embedding the control signal in the audio signal by using a pseudorandom signal to form an encoded audio signal, wherein the encoded audio signal combines the control signal and the audio signal into one signal; and sending the encoded audio signal from the first device through an audio communication channel to the device for delivering audio;

wherein the embedding the control signal in the audio signal by using a pseudorandom signal to form an encoded audio signal comprises:

generating the encoded audio signal to be equal to a signal that is at least partly based on the audio signal plus a product of the control signal and an inverse of the pseudorandom signal.

9. The non-transitory computer readable storage medium of claim 8, wherein the pseudorandom signal comprises values comprising pseudorandom invertible operators.

10. A system, comprising:

an audio output interface;

a central processing unit (CPU) coupled to the audio output interface; and a memory coupled to the CPU and storing program code that is configured to cause the CPU to execute steps comprising, generating an audio signal;

generating a control signal that is configured to control a haptic feedback device that is incorporated into a device for delivering audio based on the audio signal to a user, wherein the device for delivering audio with the incorporated haptic feedback device is separate from a device that comprises the CPU, the audio output interface, and the memory;

embedding the control signal in the audio signal by using a pseudorandom signal to form an encoded audio signal, wherein the encoded audio signal combines the control signal and the audio signal into one signal;

providing the encoded audio signal to the audio output interface; and sending the encoded audio signal from the audio output interface through an audio communication channel to the device for delivering audio;

wherein the embedding the control signal in the audio signal by using a pseudorandom signal to form an encoded audio signal comprises:

generating the encoded audio signal to be equal to a signal that is at least partly based on the audio signal plus a product of the control signal and an inverse of the pseudorandom signal.

11. The system of claim 10, wherein the pseudorandom signal comprises values comprising pseudorandom invertible operators.

12. A method, comprising:

receiving from a first device through an audio communication channel a signal that comprises an audio signal having an embedded control signal, wherein the received signal combines the control signal and the audio signal into one signal;

recovering the control signal from the received signal by using a pseudorandom signal;

using the recovered control signal to control a haptic feedback device that is incorporated into a device for delivering audio;

recovering the audio signal from the received signal; and using the recovered audio signal to generate audio in the device for delivering audio;

wherein the device for delivering audio with the incorporated haptic feedback device is separate from the first device; and wherein the recovering the audio signal from the received signal comprises:

multiplying the received signal by the pseudorandom signal to form a first resultant signal; and recovering the audio signal from a signal that is at least partly based on the first resultant signal by multiplying the signal that is at least partly based on the first resultant signal by an inverse of the pseudorandom signal.

13. The method of claim 12, wherein the recovering the control signal from the received signal by using a pseudorandom signal comprises:

recovering the control signal from the first resultant signal by filtering the first resultant signal.

14. The method of claim 13, wherein the recovering the control signal from the first resultant signal by filtering the first resultant signal comprises:

filtering the first resultant signal to isolate a narrow frequency band used by the control signal.

15. The method of claim 12, wherein the first resultant signal comprises a peak in a narrow frequency band rising above a substantially flat frequency response.

16. The method of claim 12, wherein the recovering the control signal from the received signal by using a pseudorandom signal comprises:

comparing the first resultant signal to a threshold.

17. The method of claim 12, wherein the pseudorandom signal comprises values comprising pseudorandom invertible operators.

18. The method of claim 17, wherein:

each of the pseudorandom invertible operators comprises a one element matrix; and the pseudorandom invertible operators comprise only two states of positive one and negative one.

19. The method of claim 12, further comprising:

synchronizing the pseudorandom signal with a signal that is identical to the pseudorandom signal.

20. The method of claim 12, wherein the signal that is at least partly based on the first resultant signal comprises the first resultant signal.

21. The method of claim 12, wherein the signal that is at least partly based on the first resultant signal comprises a filtered version of the first resultant signal.

22. A non-transitory computer readable storage medium storing one or more computer programs configured to cause a processor based system to execute steps comprising:

receiving from a first device through an audio communication channel a signal that comprises an audio signal having an embedded control signal, wherein the received signal combines the control signal and the audio signal into one signal;

recovering the control signal from the received signal by using a pseudorandom signal;

using the recovered control signal to control a haptic feedback device that is incorporated into a device for delivering audio;

recovering the audio signal from the received signal; and using the recovered audio signal to generate audio in the device for delivering audio;

wherein the device for delivering audio with the incorporated haptic feedback device is separate from the first device; and wherein the recovering the audio signal from the received signal comprises:

multiplying the received signal by the pseudorandom signal to form a first resultant signal; and recovering the audio signal from a signal that is at least partly based on the first resultant signal by multiplying the signal that is at least partly based on the first resultant signal by an inverse of the pseudorandom signal.

23. The non-transitory computer readable storage medium of claim 22, wherein the recovering the control signal from the received signal by using a pseudorandom signal comprises:

recovering the control signal from the first resultant signal by filtering the first resultant signal.

24. The non-transitory computer readable storage medium of claim 22, wherein the pseudorandom signal comprises values comprising pseudorandom invertible operators.

25. A system, comprising:

at least one sound reproducing device;

at least one haptic feedback device;

a central processing unit (CPU) coupled to the at least one sound reproducing device and the at least one haptic feedback device; and a memory coupled to the CPU and storing program code that is configured to cause the CPU to execute steps comprising, receiving from a first device through an audio communication channel a signal that comprises an audio signal having an embedded control signal, wherein the received signal combines the control signal and the audio signal into one signal;

recovering the control signal from the received signal by using a pseudorandom signal;

using the recovered control signal to control the at least one haptic feedback device;

recovering the audio signal from the received signal; and using the recovered audio signal to generate audio in the at least one sound reproducing device;

wherein the recovering the audio signal from the received signal comprises:

multiplying the received signal by the pseudorandom signal to form a first resultant signal; and recovering the audio signal from a signal that is at least partly based on the first resultant signal by multiplying the signal that is at least partly based on the first resultant signal by an inverse of the pseudorandom signal;

wherein a device that comprises the CPU, the at least one sound reproducing device, the at least one haptic feedback device, and the memory is separate from the first device.

26. The system of claim 25, wherein the recovering the control signal from the received signal by using a pseudorandom signal comprises:

recovering the control signal from the first resultant signal by filtering the first resultant signal.

27. The system of claim 25, wherein the pseudorandom signal comprises values comprising pseudorandom invertible operators.

* * * * *